May 12, 1970  F. A. FIRESTONE  3,511,509
METHOD AND APPARATUS FOR THE RECORDING, INDEXING, RAPID
RETRIEVING AND ASSOCIATING OF INFORMATION
Original Filed May 28, 1964  7 Sheets-Sheet 4

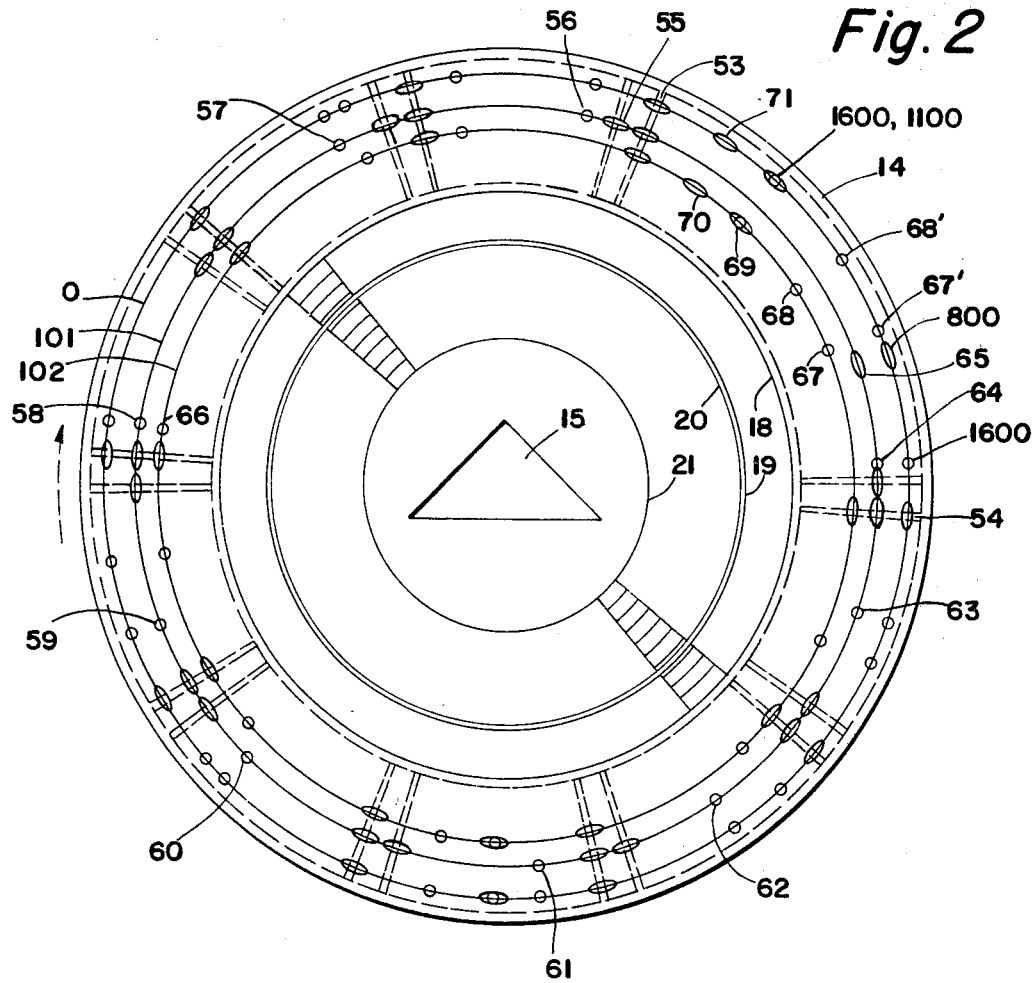
Fig. 2
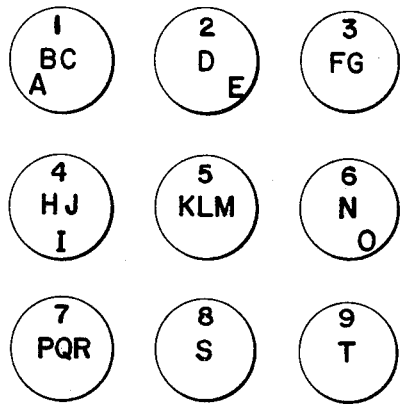
Fig. 3
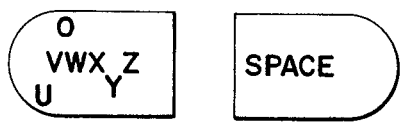

INVENTOR.
FLOYD A. FIRESTONE
BY
Peare, Pitzer & Peare

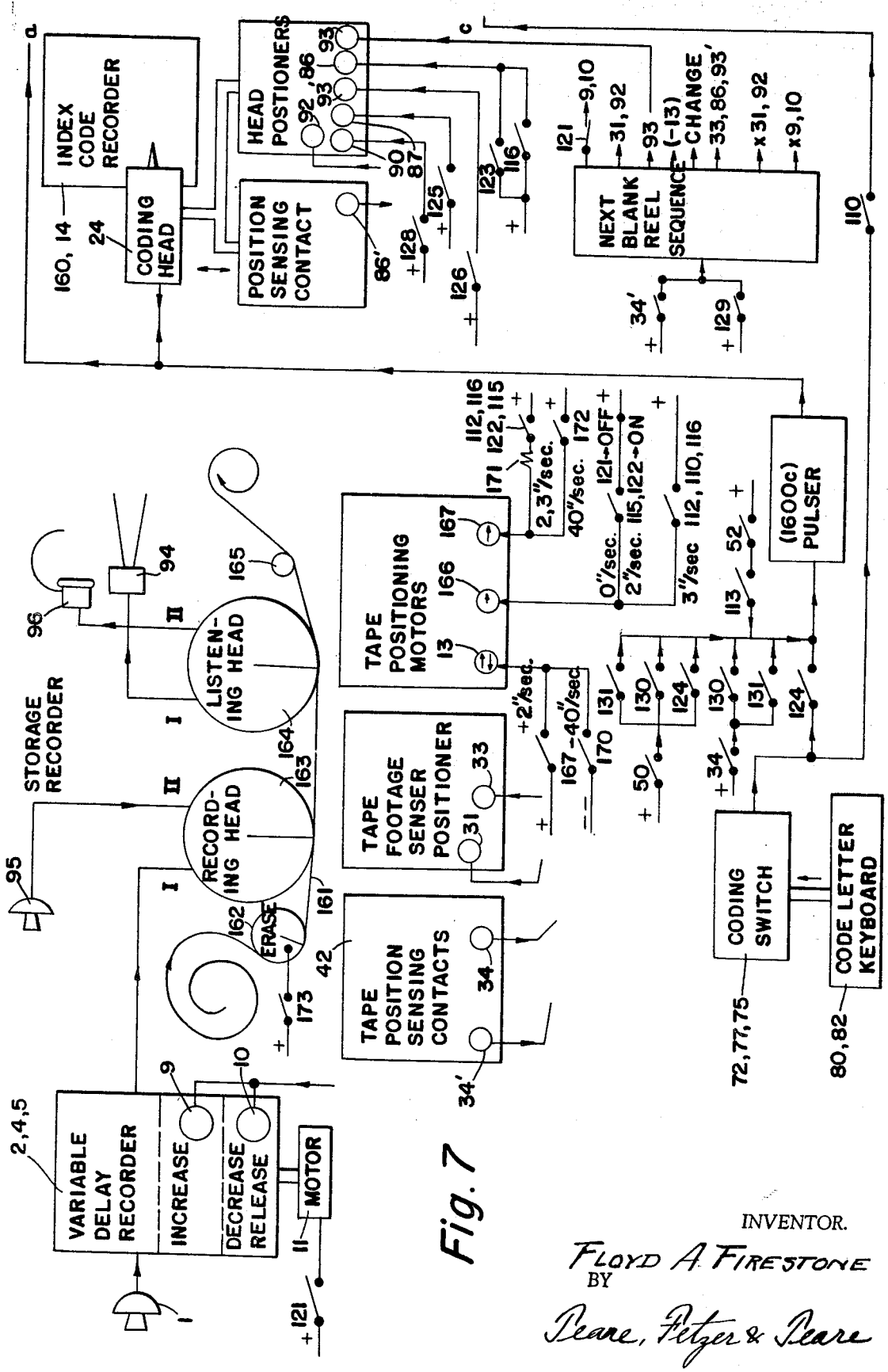

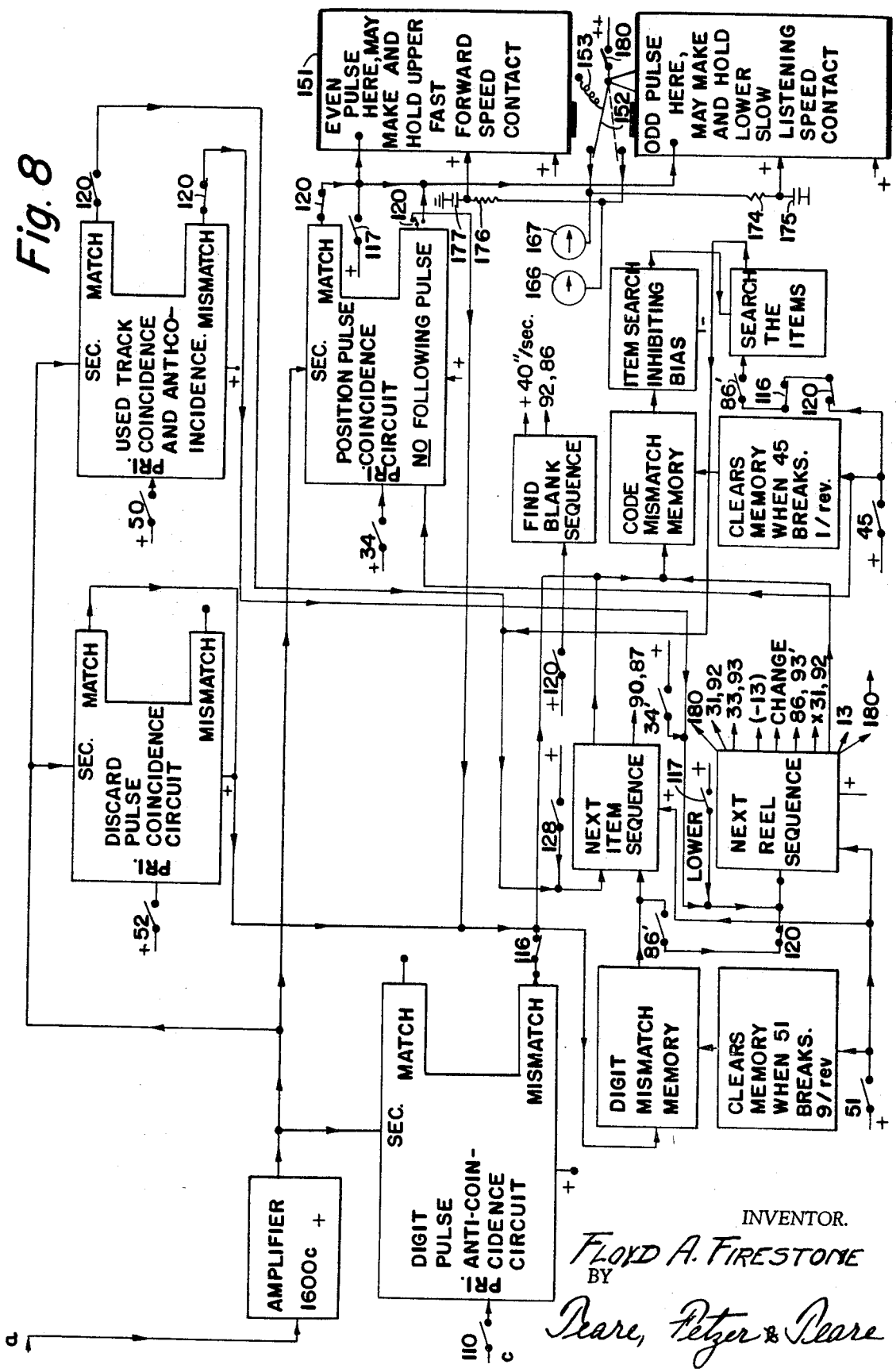

3,511,509
METHOD AND APPARATUS FOR THE RECORD-
ING, INDEXING, RAPID RETRIEVING AND
ASSOCIATING OF INFORMATION
Floyd A. Firestone, 172 Clinton Ave.,
Dobbs Ferry, N.Y. 10522
Continuation of application Ser. No. 370,794, May 28,
1964. This application Jan. 25, 1968, Ser. No. 700,651
Int. Cl. G11b 5/02, 27/36
U.S. Cl. 274—9                                  62 Claims

ABSTRACT OF THE DISCLOSURE

This invention relates to a method and apparatus for the recording and indexing of information in such a manner as to minimize the amount of time and labor required for the recording and later retrieval and association of certain desired information. The sound is passed through a delay recorder-reproducer and the storage recorder is only started after important matter is heard, so that trivial, unimportant, or silent intervals are eliminated from the bulk of the recordings while still enabling important matter to be recorded without missing its beginning portion. Furthermore, there is recorded a multiplicity of circular or repeating tracks each of which contains a code of pulses whose positions around the track set forth the subject and association level of one recorded item, and the position along the lineal sound track where it can be found. In one other repeating track there is recorded the superposition of the pulses from all the repeating tracks pertaining to all the items on this record. Searching is automatic, the pulses corresponding to a sought subject and association level are fed in, and it is first determined whether ALL matching pulses lie in the superposition track. If not, this record is returned to storage. If so, the other repeating tracks on this record are tested till the sought subject and association level are found and the reproducing transducer automatically emplaced at the beginning of the item in the sound track. In recording long items, just before changing the record, the delay of the delay recorder-reproducer is increased by a little more than the record changing time so that records can be changed without missing a word. Means are also provided for automatically starting the recording of an item on the end of the recorded portion of a partially recorded record which has been removed. In tape embodiments, the repeating tracks are recorded on the tap reel face, thus enabling preliminary searching without threading the tape.

---

This application is a continuation of application Ser. No. 370,794, filed May 28, 1964, and now abandoned.

It is known that the intellectual output of scholars is at a maximum at about age 35 and that their mental ability gradually deteriorates to such degree that compulsory retirement by age 70 is the rule. Part of the ineffectiveness of the elderly is due to inability to remember, recall and associate information previously gained. My invention concerns a brain booster or intelligence amplifier which can be used advantageously by both young and old as a personal means of remembering, and quickly recalling and associating desired information. For example, my invention can be advantageously used by the airplane pilot even though his eyes are otherwise occupied, in retrieving and associating all weather information which he has received interspersed in radio contacts on many subjects, or by the blind person in storing and associating the information which he has gained from conversations, lectures or listening to the radio. The apparatus and operating supplies for carrying out my invention can be of such low cost as can reasonably come within the budget of an individual, and the information recording and associating apparatus can be miniaturized for convenient operation in the pocket.

It is the object of my invention to provide a method and apparatus for the rapid recording and indexing of information and for the rapid finding and association of desired items of information.

It is a further object of my invention to provide a method and apparatus which, if used by a user for some time and then used in an intelligence test of the user, will enable him to obtain an amplified intelligence quotient as compared with his taking the same test without ever having used the method and apparatus.

It is a further object of my invention to provide a method and apparatus for recording and indexing sound in such a way that from a sequential recording of items covering a random mixture of subjects, only those items which pertain to a subject now sought by the user will be automatically reproduced in usccession so that they may rapidly be associated in the user's mind.

It is a further object of my invention to provide a method and apparatus for recording both a sound track and its coded index and outline on the same record, the position signals of each index item being added contemporaneous with the recorded sound while the corresponding subject and outline code may be added later.

It is a further object of my invention to provide a method and apparatus for changing the records on a speech recorder without missing the recording of a single word of the discourse.

It is a further object of my invention to provide a method and apparatus for intermittently searching for sought subjects and recording additional matter on the immediately following blank portion of the record, the practice of said method and the use of said apparatus not requiring the user to use his eyes, all controls being operable by touch.

It is a further object of my invention to provide a method and apparatus which shall permit the user to record from a continuing sound only those time intervals containing sound sequences which he judges to be of significance or importance to him.

It is a further object of my invention to provide a method and apparatus for permitting subject matter deemed trivial at recording time to be withheld from a sound recording, and indexed subject matter which has been recorded to be later eliminated in whole or in part from whole records or indexed items, so that a subsequent search shall not reproduce such eliminated portions.

Other objects and advantages will be apparent from the specification and claims, and from the accompanying drawings which illustrate what are now considered to be preferred embodiments of my invention.

FIG. 2 is a plan view of a typical recording disc as employed in my invention, showing the annuli devoted to the sound track and index coding tracks, and the dotted sectors reserved for the recording of item subject code, association level, item position, discard and used track pulses.

FIG. 3 is an alternative code letter keyboard especially useful on a portable machine and having roughly equal probabilities of usage of all keys.

FIG. 5 should be considered as lying to the right of FIG. 4 when both are held with their long dimensions horizontal.

FIG. 7 is one-half of a block diagram of the apparatus and shows the connections between the portions of the apparatus used principally in recording and indexing on tape.

FIG. 8 is the second half of the block diagram and shows the connections between the portions of the apparatus used principally in the searching, scanning, listening to and editing of tape reels.

THE THREE RECORDERS

Figure 1:
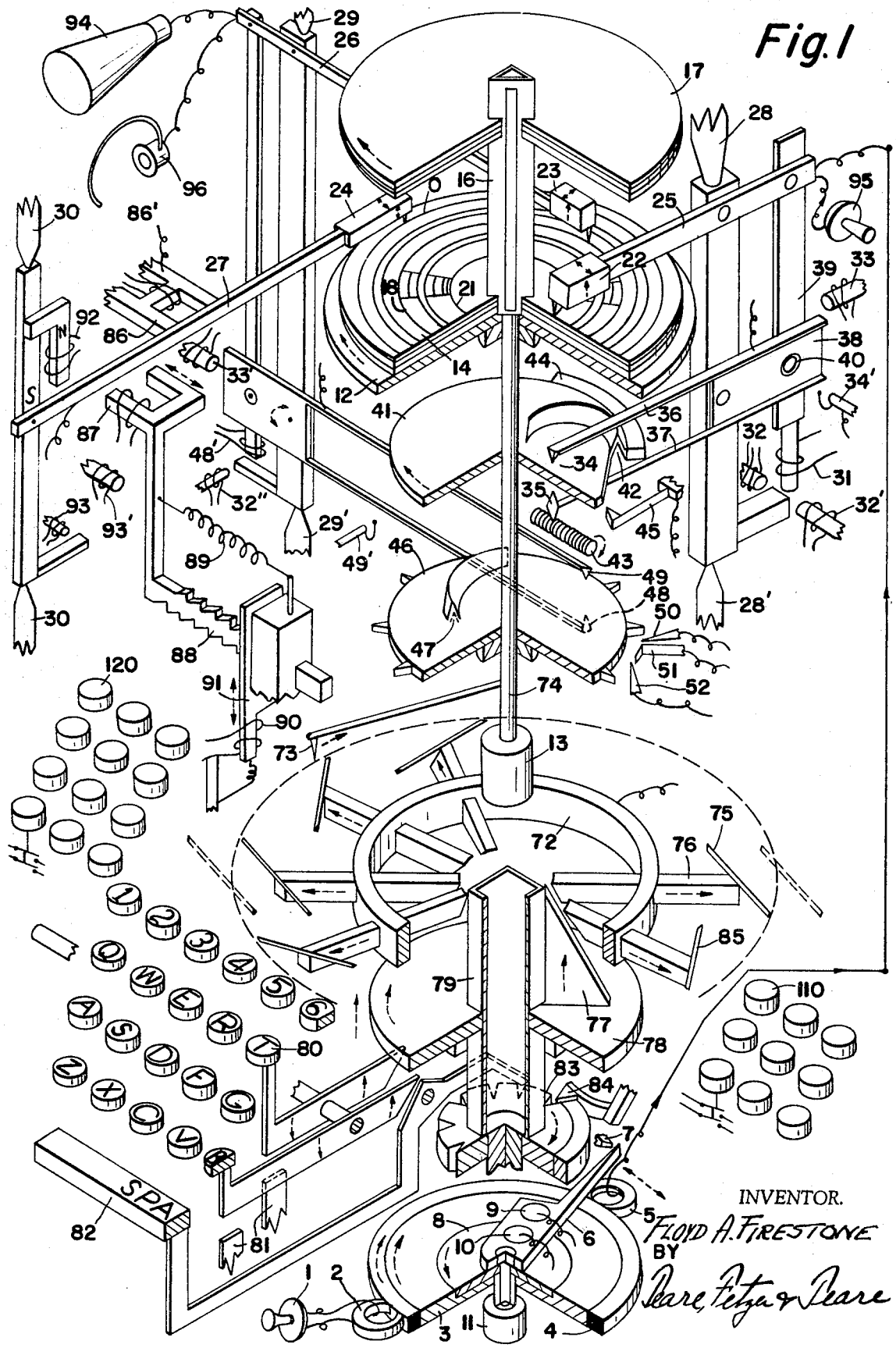
FIG. 1 is an isometric three-quarter section showing the mechanical portions, some electrical portions, and the operating keys, of a disc type of delayed sound recorder, index coder, searcher and scanner, in accordance with my invention, and constituting an intelligence amplifier.

My invention utilizes three specialized coacting sound recorders: a delay recorder, a storage recorder, and an index code recorder.

THE DELAY RECORDER

If one attempts to use a conventional sound recorder for the purpose of recording conferences, meetings with people, radio programs, etc., he finds the records being diluted by much trivial matter not worth recording or reproducing and which so dilutes the important matter as to increase the difficulty of finding and reproducing a desired important subject later. If the user waits to start the recorder till an important statement has been heard, it is already too late to record it. My invention utilizes a delay recorder which continuously erases a magnetic sound track, records the speech now being heard by the user, and reproduces it a fraction of a minute later, this delayed output of the delay recorder being recorded on the storage recorder which is started by the user only if he judges the matter to be worth recording. He has the delay time in which to make up his mind; he can thus serve as a trivia trap. This technique may reduce the amount of stored recording by a considerable factor and thereby reduce the time required to find and reproduce a desired fact, at the same time reducing the record expense.

More importantly, the delay gives the user time to initiate the indexing and coding of the material which he has just heard so that he can feed to the index code recorder a signal recording the position in the storage recorder's sound track where the beginning or end of an indexed item is to be found, which position signal will be substantially contemporaneous with the delayed material now being recorded by the storage recorder. Detailed indexing and coding of this item on the index code recorder, can threafter be done by the user as time permits but accurate position signals will already have been recorded on the index code recorder.

Furthermore, it is important that a recorder for use in a long conference or trial be capable of having its records changed without missing the recording of a single word, and the delay recorder permits this. During the record changing interval, the delay recorder continues to record but the amount of the delay is increased by a time equal to the record changing time, by moving the pickup at the speed of the magnetic track. When the blank record is in place on the storage recorder, it continues to record the output from the delay recorder. No word will have been missed by the storage recorder. The delay may now be slowly decreased to its standard value by slowly moving the pickup back to its initial position, taking advantage of the observed fact that a 10% increase in the speed and pitch of the speech now entering the storage recorder will not substantially decrease its intelligibility.

THE STORAGE RECORDER

While the sound recording principle may be one of several well known in the art, a preferred form of storage recorder utilizes separate recording and listening heads operating in an embossed spiral track on an annular portion of the area of a plastic disc record. By means of similar cams mounted on the turntable shaft, these two heads can be moved in phase radially over the annulus of the spiral while the turntable turns through an arc of say 66° and either head can, in response to an electrical signal, be disengaged from its cam and placed in contact with the record at the radius where it was when the signal was received. Each cam also has a contacting arc of the same shape as the cam and which engages a contactor mounted on its associated head, so that whenever a head is in contact with the record the user can obtain a signal pulse which will occur when the turntable is in an angular position which is a function of the radial position of the head (pulse-position modulation). This pulse can be recorded in the 66° position arc of the index coding recorder which is recording by means of a third "coding head" in a circular track in a different annulus of this same disc record.

Thus whenever the recording or listening head is in contact with the disc, the user can obtain a head position signal which can be recorded on this same record in the 66° arc of one of the circular coding tracks, which signal can be picked up later by the coding head and used for automatically placing either the recording or listening head back at that same radius of the spiral sound track by means of a cam. Two types of pulses, discriminable on the basis of frequency (for example, a "high" short pulse consisting of a wave train of 10 cycles at 1600 cycles/sec. thus lasting .00625 sec. and occupying 0.45° of code recording track at 12 r.p.m. and a longer "low" pulse consisting of 10 cycles of 800 cycles/sec. thus lasting .0125 sec. and occupying 0.9° of recording track at 12 r.p.m.), permit the beginning of an indexed item to be discriminated from its end, so the listening head may be placed on the sound track at the beginning of the item or the recording head may be placed at the end of a final item for resuming the recording on the immediately following portion of blank record.

THE INDEX CODE RECORDER

The user expresses the subject of the item being recorded on the storage recorder, in an index code word of say seven letters and expresses the association level or outline (whether subject class, headline, abstract, summary, critique, footnote, subtitle, chapter heading, or paragraph heading) in one additional single digit numeral or letter, and these eight digits constitute the index code for this item. By means of a keyboard, these eight digits are entered as adjustments in a code switch which makes eight short contacts in one revolution of the turntable, the exact phase of turntable rotation of each contact being a function of the letter in one digit of the code. This pulse-time coded index is now recorded in less than one revolution through the coding head into a considerable portion of one of the circular tracks lying in a reserved annulus of the same record disc on which the speech is being recorded by the storage recorder. Each digit of the index code is recorded by pulse-position in one of eight separated arcs of say 30° each thus leaving room in this circular track for the 66° storage recorder head position arc, in addition to nine separated 1° arcs for pulses indicating that this track has now been *used*, nine separated 1° arcs into which pulses may be placed to indicate that the sound track material covered by this index item has now been *discarded*, and nine separated 4° arcs to which radial motion and placement of the coding head is confined so that false signals shall not be introduced into the effective arcs of the circular track by scratches.

Each circular track therefore records by pulse-position the essential information of the single items in a book's index and table of contents, namely the subject, the association level or outline, and the position where the subject material is located. (However, the apparatus of my invention may go farther and automatically search the index items for a desired subject and reproduce the pertinent items in succession, the search being limited to any desired association level or degree of generality or importance.)

The number of concentric circular coding tracks on one disc might be of the order of 2 or 40 but in any case the outer track O is reserved for the recording of the superposition of the pulses from all the other tracks. After an item track has been recorded in one revolution, the coding head is moved to the sum track O and the same pulses (except the discard pulses) recorded in a second revolution. Any search is started in this sum track O which pertains to the entire disc, and we may thereby find that even the first or an early letter of the sought code is *not* present in that digit in any of the index items of this disc, so the search of this disc may be completed in a fraction of a revolution with a great saving in searching time.

Further, by scanning the 66° position arc of the sum track O backwards till the last "end" signal to be recorded is met, the recording head of the storage recorder can be automatically emplaced at the beginning of the blank sound track remaining on a partially recorded disc, so recording may be quickly resumed after searching. In this case the coding head can be autocatically emplaced in the next blank circular track by scanning the 1° "used" arcs in the circular tracks at nine tracks per revolution until the first blank track is found. Recording and index coding can then proceed normally till the storage track of this disc is full. A blank disc is then put in place without missing the recording of any word, as previously explained.

Seven digits each capable of discriminating 36 letters and numerals, have a maximum capability of discriminating $36^7 = 6.6 \times 10^{10}$ subject items. Though this num- will be considerably reduced if the subject codes are based on English words, due to the fact that some letters have much greater frequency of usage than others, a large number of subjects can be discriminated and the probability of erroneous coincidence will be very low. Even if a single item is indexed under several subjects simultaneously and the coding pulses for these subjects superimposed in one coding track, there is but a low probability of an erroneous coincidence being observed, due to the nature of the logic employed in the scanning apparatus, namely, the *absence* of a single sought code letter from *any* digit *rejects* the item.

SEARCHING.—THE CODE MATCH DETERMINING CIRCUIT

To find a desired bit of information which has been recorded, the user thinks up code words which might have been used in indexing pertinent subjects at the time of recording, and assembles all discs recorded in the pertinent time interval, if known. By means of the keyboard, the code switch is set for one of the codes sought and the discs are run in succession on the turntable. The code switch now feeds its pulses to a match determining circuit which also receives pulses which are picked up by the coding head from an index coding track on the disc. The match circuit considers the pulses from the code switch as primary pulses and unless *every* pulse from the code switch is matched by a coinciding secondary pulse from the coding head, the match circuit declares a "mismatch" and at the end oft he present code *digit* (not waiting for the remainder of this code track to be scanned) moves the coding head to the next track (crossing a 4° sector) or initiates the changing to the next disc. No mismatch will be declared merely due to there being *no* pulse from a certain digit from the code switch nor due to there being additional pulses from the coding head which are not matched by code switch pulses; thus the code switch pulses are primary pulses while the coding head pulses are secondary.

In looking for the subject code of NEEDLES in a haystack of discs it is essential that the searching be done at highest practicable overall scanning speed. As previously mentioned, the sum track O on any disc is scanned first and if *any* mismatch is found, disc changing is started as soon as the next 4° coding head radial motion sector arrives at the coding head (approximately within one-tenth revolution). If a match is found in sum track O, the scan progress to index code tracks 1, 2, 3, etc., each mismatch moving the coding head to the next track as soon as the next 4° radial motion sector comes along. Thus a whole disc can be rejected in as little as one-tenth revolution of scanning, and individual index code tracks with mismatch can be scanned over at speeds up to 8 tracks per revolution.

When an individual index code track with matching code is found, the match circuit places the listening head under the direct control of the position pulses which the coding head will soon pick up from the 66° position arc of this track and upon the arrival of the *first* "item begins" pulse at the coding head (recorded as 1600 c.) the cam will place the listening head on the sound track at the radius of the beginning of the item and the sound reproduction will begin. A new type of scanning of the 66° arc is now started wherein by means of filters the position pulses which were recorded at 1600 c. are separated from those recorded at 800 c., and these are each entered as secondary pulses into two additional match circuits which are being fed the listening head position signals as primary pulses. Thus for as long as there is sound reproduction, the only pulse from the index coding track which will have any effect is such a single pulse from the 66° position arc as may coincide in represented position with the present position of the listening head and such a coincidence may not occur for many revolutions and possibly only when the listening head has reached the end of the indexed item. The *first* 1600 c. pulse which emplaced the listening head, will have no further effect since its represented position has already been slightly passed by the listening head. If the next coincidence is with a 1600 c. pulse, the output of the 1600 c. match circuit will cause a visual or audible signal which indicates emphasis or something worthy of attention. If the next coincidence is with an 800 c. pulse, the output of the 800 c. match circuit will cause the listening head to immediately engage its cam so as to be carried farther forward, the reproduction ceasing and the listening head being again placed under the *direct* control of any 1600 c. pulse which may *follow* in the 66° arc. If such additional 1600 c. pulse were found, reproduction would begin again and continue until an additional 800 c. pulse were found by coincidence scanning. Direct scanning for 1600 c. pulses would then continue till the end of the 66° arc were reached (in a fraction of a revolution), whereupon the coding head would be moved to the next circular track and the determination of code mismatch or match resumed.

Thus the 66° arc associated with each coded item not only enables the beginning and ending of the item on the sound track to be recorded by 1600 c. and 800 c. pulses, but *within* the item the beginning and ending of a certain section may later be marked trivial by an 800 c. pulse and a later 1600 c. pulse and the listening head will automatically pass it over. Further, emphasis may be indicated by additional 1600 c. pulses. Thus two of the control keys are labelled:

Position where:

ITEM BEGINS _____ ITEM ENDS.
TRIVIA END _____ TRIVIA BEGIN.
EMPHASIS (1600 c.) _____ (800 c.).

The left key records 1600 c. pulses in the 66° position arc and the right key records 800 c. pulses.

As the 1600 c. and 800 c. pulses come from the coding head, they are amplitude modulated downward by any pulse of say 1100 c. which may be superimposed, so any 1600 c. or 800 c. pulse can effectively be erased by recording over it in the coding track a pulse consisting of say 16 cycles of 1100 cycles/sec. lasting .0145 sec. and occupying 1.045° of recording track at 12 r.p.m.

If, when the reproduction of an item has progessed a short time, the user recognises that it will not disclose the information desired, he should press the RESUME SCAN key, the reproduction will stop, and the direct scan for 1600 c. pulses will resume. The user can judge whether the association level digit should be included in the code when searching; for example, if the *headline* level *is* included, only that introductory portion of each item pertaining to this subject will be automatically reproduced as will enable the general nature of its subject matter to be perceived. This is accomplished by having an index code track devoted to the headline only of this item, its 66° position arc carrying a 1600 c. begin pulse with an 800 c. end pulse soon thereafter. The remainder of this item may then be indexed in the next index track without the headline digit.

Editing or indexing may also be done while *listening* to a record. Additional 1600 c. emphasis pulses may be added to index tracks already recorded, an additional index code item may be recorded in the next blank track, subject codes may be filled in for tracks which at recording time had been hastily identified by a 1600 c. begin pulse only, a certain portion may now be marked trivial both in the index code track and the sum track O, or a whole item or whole disc may be discarded by adding nine 800 c. discard pulses in the discard arce of the item or sum tracks. In the searching process, any discard pulse produces a mismatch immediately.

All references to the name "Kenneth" can be subject coded as NAMEKEN, and can be reproduced in succession in a search, but if the user cannot remember the man's name, the discs can be searched for NAME and all names of people will be reproduced in succession and Kenneth thereby found. This is like an author index.

To quickly find out what a disc contains, the user scans the 66° position arc of sum line O for 1600 c. pulses and thereby listens for a few seconds to the beginnings and emphasized portions of all items on the disc. This arc is like a table of contents. If at the time of recording, the user has had an opportunity to pronounce into the storage sound track (or into a second channel thereof) the code word which is to be used in indexing that and similar items, then this position arc scanning will enable the code words for associated material to be found if not already known, and thereafter the position scan may be changed to a subject code search, which is faster.

For simplifying the exposition, throughout this specification the pulses which were recorded at oscillation frequencies of 1600, 1100 and 800 c. say, have been referred to as if they were reproduced at those same frequencies with the turntable operating at equal reproduction and recording speeds. However, in order to save searching time it is desirable that reproduction during searching be at 1.5 times the recording turntable speed and the corresponding reproduced pulse frequencies would be 2400, 1650 and 1200 c., and the filters which separate these reproduced pulses should be retuned accordingly when the reproduction speed is changed.

While discs are a preferred form of recording medium because of the rapid access to all parts of the sound track, my invention may also be applied to recording on tape or wire, the index code being recorded in concentric circular tracks on a plane face of a reel on which the tape or wire is wound. Thus all reels or magazines which do *not* contain a sought index code item, can be eliminated from the search after only a fraction of a revolution of the index code reel with the coding head operating in the sum track O. But if a concentric track for the sought index code item *is* finally found, the tape or wire is wound forward fast till there is a coincidence between a pulse from a means which senses the amount of tape or wire on the reel and a begin signal picked up by the coding head from the position arc of the sought track which has just been found. The tape or wire is then slowed to 1.5 times recording speed and reproduction begins, the exact position of the item being indicated by the hearing of the begin pulse which had also been recorded in the sound track, or the final exact positioning at the beginning of the item is automatically controlled by an additional begin signal recorded in a second track on the tape and picked up by direct scan of that second track after the index code track position arc has located the approximate tape position by coincidence as mentioned just above.

The numerical values which are given throughout this specification are for the purpose of exemplifying a good design of apparatus embodying my invention, and aiding the comprehension of the method of the invention, but wide departures from these numerical values may be made without departing from the scope of the invention.

DETAILS OF THE DELAY RECORDER

Referring to FIG. 1, all sound to be recorded, and the trivia in addition, enters the system through microphone 1 (bottom). This sound contains the primary information to be recorded, usually in the form of speech. Microphone 1 feeds the erase-record head 2 of the magnetic delay recorder which includes disc 3 of say 8 inches diameter rotating clockwise at say 2.5 r.p.m., its outer edge being faced with an annular cylinder 4 of long wear magnetic rubber. Magnetic pickup head 5 is mounted on rotatable arm 6 which normally rests against stop 7 so as to hold pickup head 5 against the magnetic track 4, 180° from the erase-record head 2, the sound normally being picked up by head 5, 12 seconds after it entered microphone 1; the output of pickup head 5 is continuously fed to channel I of the recording head 22 of the storage recorder detailed below.

The 12 second delay permits the user to continuously discriminate trivia from matter of sufficient importance to be worthy of storage recording. He stops the storage recorder and index code recorder while trivia are being picked up by pickup head 5, and runs the storage recorder and index code recorder while matter judged worthy of storage recording is being picked up. These actions by the user are governed by his knowledge that the sound which he can storage record now, is the sound which he heard entering the system the delay time ago.

Inset flush into the central portion of disc 3, is a second disc 8 which rotates *counterclockwise* at say one-tenth the speed of disc 3, namely, 0.25 r.p.m. Just before starting to change a record on the storage recorder, magnetically operated clutch 9 is energized to effectively clamp the arm 6 to disc 3 and carry pickup head 5 clockwise right along with disc 3 and magnetic track 4 for about 120°, in a time of 8 seconds, during which interval *no* audio voltage is generated by pickup head 5. This 8 seconds is an adequate interval for changing the disc (or tape magazine) on the storage recorder, whether done manually or automatically. Just after the storage recorder is ready to record on the new blank disc, clutch 9 is released and clutch 10 is permitted to clamp arm 6 to disc 8 moving slowly counterclockwise, and pickup head 5 is in 80 seconds carried back to its normal 180° position from which it started, and as shown in the drawing. During the 80 second carry back period, the speech as recorded on the storage recorder will be 10% higher in pitch and 10% faster than the original, but this will not appreciably influence its intelligibility. The beginning of the new record on the storage recorder will repeat a couple words from the end of the old record, but no words will be missed, a very valuable feature for a conference or trial recorder.

The normal delay is 12 sec., but becomes 20 sec. just after record changing, and gradually returns to 12 sec. within the 80 sec. carry back period, the exact value at any instant being indicated by the position of arm 6. The motions of discs 3 and 8 are supplied by a geared motor 11 and all time intervals mentioned above can be decreased by increasing the speed of this motor.

The user initiates the indexing and coding of the material which he heard the delay time ago, by pressing either of the two position recording buttons, which record on the index code recorder either a 1600 c. pulse indicating the position where Item Begins, Trivia End or Emphasis—or an 800 c. pulse indicating the position where Item Ends or Trivia Begin. The presence of the delay recorder in the system permits the user to add to the position arc of a track on the index code recorder, a pulse which accurately indicates the position of the recording head on the storage recorder at the time when it is recording the beginning or end of the item to be indexed; thus the position pulses of the beginning and end of items are kept contemporaneous with the items as they are storage recorded. Detailed indexing and coding of this item can thereafter be done by the user as time permits, but accurate position signals will already have been recorded on the index code recorder.

Thus the delay recorder coacts with the other elements of the apparatus in three ways: it permits the user to eliminate trivia before storage recording, permits the changing of records on the stoage recoder without missing a word of the discourse, and permits the addition of contemporaneous position pulses to the index code recorder to accurately mark the beginning and end of items.

If the user is recording his own speech only and thereby has advance knowledge of its content, he can omit the delay recorder, indexing his discourse with the aid of the remaining features of the invention.

DETAILS OF THE STORAGE RECORDER

Referring now to the upper portion of FIG. 1, turntable 12 is driven by motor 13 (center) clockwise at say 12 r.p.m. while recording, at say 18 r.p.m. while searching, at 18 or 12 r.p.m. while reproducing, at 0 r.p.m. while trivia are being rejected, and at say −18 r.p.m. (counterclockwise) while emplacing the recording head at the beginning of the blank portion remaining on a partially recorded disc to resume recording after searching. Turntable 12 can carry a multiplicity of recording discs 14 which rotate with it, usually stacked in the order in which they were recorded. As shown also in FIG. 2 which is a plan view of a single disc, each disc has an enlarged triangular center hole 15 which accurately centers and uniquely orients the disc relative to the turntable. A multiplicity of additional discs 17 may constitute an upper magazine held near the top of center pin 16. When recording, the discs in the magazine would normally be blanks, but when searching or scanning, they may be fully or partially recorded discs. Automatic record changers which can function from within a hollow center pin are well known in the art and the details of the changer do not constitute part of this invention; if used, the changer should preferably be capable of moving a disc in either direction between the turntable and the magazine. However, my invention can also be practiced if the discs are handled manually.

Any of the sound recording principles which the art ordinarily employs with discs may be utilized here in the storage recorder and index code recorder record in different netic recording with pre-grooved discs, and it is not necessary that these two recorders use the same recording principle even though they record on the same disc. The drawings should be given this broad interpretation. The storage recorder and index code recorder record in different annuli on the same disc, and which one shall be assigned to the inner annulus is subject to choice. In FIG. 2, the storage recording is shown as having been done in an inner annulus surrounding the center hole 15, a first item having been storage recorded in a spiral track extending from radius 18 inward to radius 19, and a second item extending from radius 20 to radius 21, there being some blank recording space inside radius 21. The annulus outside radius 18 is devoted to the circular tracks of the index code recorder and will be explained under that heading below.

The same FIG. 2 disc is shonw in FIG. 1 on top of the stack 14 on the turntable 12, the first item starting at radius 18 and the second item ending at radius 21. Recording head 22, preferably of two channel type, is shown with its needle (or gaps if magnetic) also at radius 21 where the second item ends. Listening head 23, preferably of two channel type, is shown with its needle (or gaps) at radius 18 where the first item begins. The index coding head 24 of the index code recorder is shown with its needle (or gap) in the outer circular track, the sum track O. These heads are supported in conventional fashion on arms 25, 26 and 27 respectively, so that they can swing to different radii around the pairs of supporting pivot points 28, 29 and 30 respectively.

Recording head 22 can be raised off the disc by energizing coil 31, be swung clear of the disc for record changing by energizing stationary coil 32, returned to a position over the beginning radius 18 by energizing stationary coil 33, or swung to the minimum sound track radius just inside radius 21 by energizing stationary coil 32'. Directly beneath the needle of recording head 22 at all times, and beneath the turntable, are two pointed members 34 and 35 which are carried on arms 36 and 37 which with plate 38 form a rigid member which swings with the recording head 22 about the vertical axis determined by pivots 28 and 28'. Pointed members 34 and 35 also rise and fall grossly when recording head 22 is raised and lowered, since plate 38 is connected to arm 25 through link 39, some play being provided at pin 40 to allow for different numbers of discs under the needle of recording head 22. Recording head cam disc 41 has pressed upward through it an indentation 42 which, when pointed member 35 is raised against the disc by the raising of the recording head 22, will swing member 35 (and hence the needle of recording head 22) from beginning radius 18 to the inner recording radius while the cam disc rotates through the 66° which has been assigned as the length of the head position recording arc in each circular track of the index code recorder. When pointed member 35 is in the down position (the needle of recording head 22 being in contact with the disc) its lower point engages the thread on the slowly rotating lead screw 43 which governs the spacing between adjacent turns of the spiral sound track. Pointed member 34 now being in its lower position can now make contact (or come close, making electrostatic contact) with the sharpened upper edge of indentation 42, thereby supplying a signal pulse whose position along the 66° arc is a single valued function of the radial position of member 34 and the needle of recording head 22. When member 34 and the recording head 22 have traveled to the minimum sound track radius, extra contact 34' (right) is *made*, to initiate the changing to the next blank without missing a word. Cam disc 41 also carries a 66° sectorial extension 44 which acts with stationary contactor (or electrostatic contactor) 45 to insure that only during the 66° arc shall the pulses picked up from the circular tracks by the index coding head 24 signify position in the spiral sound track.

Listening head 23 is carried by an arm, cam and contactor mechanism very similar to that just detailed for the recording head 22, except that the listening head group is 90° counterclockwise from the recording group in order to avoid mechanical interference. Listening head 23 can be raised off the disc by energizing coil 48', be swung clear of the disc for record changing by energizing stationary coil 32", and returned to a position over the beginning radius 18 by energizing stationary coil 33'. Listening head cam 46 has 66° cam indentation 47 identical with indentation 42, into which dotted pointed member 48 will later engage when it is raised by the raising of the listening head; this will carry the listening head inward from radius 18 to the smallest radius recorded. The sharpened upper edge of indentation 47 also makes contact with pointed member 49 when said member is in a lowered position due to the lowering of listening head 23 onto the disc, thereby supplying signal pulses indicating the listening head position. When the listening head has traveled to the minimum sound track radius, extra contact 49' (left) is *made*, to initiate the searching of the next item or the scanning of the next disc.

These identical cam indentations 42 and 47 are oriented just 90° apart so that they could (though they would not normally be called upon to do so) simultaneously carry recording head 22 and listening head 23 inward from radius 18 so that their respective needles would at every instant be at the same radii, as would also pointed member 34, 35, 48 and 49. Thus a position pulse positioned by either the recording or listening head position contacts 34 or 49 may be later used to reset either that same head or the other head to that position with the aid of the cam follower members 35 or 48.

Listening cam 46 also carries on its periphery nine contactor spikes 36° apart (leaving one space of 72° to contain the 66° arc) which cooperate with stationary contacts to perform functions for the index coding recorder as follows: contact 50 controls nine short pulses which are recorded in an index sum coding track O, or item tracks 101, 102, etc. (FIG. 2), in order to indicate USED TRACK whenever any other pulses are recorded in a coding track; contact 51 determines the nine 4° disc orientations in which radial motion of the coding head is permitted without scratching the pulse recording sectors of the disc; and contact 52 controls nine short pulses which are recorded in an index sum coding track O, or item tracks 101, 102, etc., if it is desired to DISCARD WHOLE DISC or DISCARD ITEM.

Channel I of listening head 23 reproduces through speaker 94 (upper left) only the sought information from the mixed discourse which had previously entered microphone 1 (bottom), while channel II reproduces through auxiliary speaker or headphone 96 the user's contemporaneous commentary and verbalization of each subject code (later designated as association level 3) which had entered the storage recorder through channel II microphone 95 (upper right).

DETAILS OF THE INDEX CODE RECORDER

Referring to FIG. 2, the index code recorder records pulses in circular tracks 0, 101, 102 etc., which lie in the annulus from near the periphery of the disc inward to near radius 18 where the spiral sound track begins. Whereas the customary spacing of adjacent grooves in the spiral sound track is of the order of .004 inch, the spacing between adjacent circular index coding tracks might be of the order of .012 inch so as to tolerate more record distortion, and 40 item index tracks could lie within an annulus one-half inch wide. This index coding annulus is divided into sectors as shown by the dotted lines (whose radial boundaries would have a slight curvature due to the coding head swinging in a small arc) and any pulse recorded in that part of a circular track which lies within any sector, has an assigned functional significance. Thus the significance of a pulse in any circular track, depends on the placement of the pulse around the track as well as upon the pulse frequency. Though the short pulses might be invisible to the naked eye, the highest frequency pulses of say 1600 c. are here indicated by small circles such as the one numbered 1600 at the right, and the lowest frequency pulses of say 800 c. are indicated by small ellipses such as the one numbered 800. A 1600 c. pulse which has been effectively erased by the superposition over it of a pulse of say 1100 c., is indicated by a small circle surrounded by a small ellipse, such as the symbol numbered 1600, 1100 at the upper right. Table 1 below summarizes typical specifications of these three pulse types. One way to produce these pulses is with the aid of a voltage train generator as disclosed in Firestone U.S. Pat. 2,398,701.

TABLE 1.—TYPICAL SPECIFICATIONS OF THREE PULSE TYPES

| Cycles | Frequency, c. | Duration, sec. | Recording angle at 12 r.p.m. | Usage |
|---|---|---|---|---|
| 10 | 1600 | .00625 | 0.45° | ADD CODE ITEM BEGINS, TRIVIA END, EMPHASIS. |
| 16 | 1100 | .0145 | 1.045 | ERASE. |
| 10 | 800 | .0125 | 0.9 | ITEM ENDS, TRIVIA BEGIN, USED TRACK, DISCARD. |

The disc rotates clockwise during recording so the coding head effectively scans the stationary disc of FIG. 2 counterclockwise, and we will assume that this scan starts with that 1° sector 53 (top) in which any 800 c. pulse signifies USED TRACK. Starting with fiducial sector 53 and scanning counterclockwise, the sectors are laid out in a repeating pattern thus, 1° 4° 1° 30°, 1° 4° 1° 30°, etc., up to eight such 36° units if the subject and association level index code is to contain eight digits. However, the unit starting with 1° sector 54 (right) is exceptional in having 72° made up of (starting with sector 54) 1° 4° 1° 66° in which accurate recording and listening head position pulses can be recorded. In *each* such 36° unit (1° 4° 1° 30°), a pulse (800 c.) in the first 1° sector indicates USED TRACK; no pulses are recorded in any 4° sector since it is reserved for the movement of the coding head from one track to another. A pulse (800 c.) in the second 1° sector indicates DISCARD of this whole item if it is in an item track and DISCARD of this whole disc if it is in the sum track O. The 30° sector may effectively be divided into say 36 sectors of ⅚ degrees each so that the position of a pulse (1600 c.) along a 30° arc shall effectively indicate one of the 26 letters plus 10 numerals. These assignments of the sectors are summarized in Table 2 below.

Typical Assignment of the Functions of the Coding Sectors of the Index Coding Annulus of the Record, into which the Index Coding Pulses are Recorded. (Read conventionally rightward and downward from line to line, to read the sectors in the order of their traverse by the coding head each time the disc rotates once, starting from 1° USED TRACK sector 53.)

TABLE 2

| Nine 1° USED TRACK 800 c. Pulse Sectors | Nine 4° Coding Head Radial Motion Sectors | Nine 1° DISCARD ITEM or DISCARD WHOLE DISC 800 c. Pulse Sectors | Eight 30° Index Code Digit Sectors, Each of 36 Sectors of 5/6°, For 1,600 c. Pulses Indicating One or More of 26 LETTERS and/or 10 NUMERALS |
|---|---|---|---|
| 1° No. 53 | 4° | | 1° 30° Association Level Digit. |
| 1° No. 53 | 4° | | 1° 30° First Subject Code Digit. |
| 1° No. 53 | 4° | | 1° 30° Second Subject Code Digit. |
| 1° No. 53 | 4° | | 1° 30° Third Subject Code Digit. |
| 1° No. 53 | 4° | | 1° 30° Fourth Subject Code Digit. |
| 1° No. 53 | 4° | | 1° 30° Fifth Subject Code Digit. |
| 1° No. 53 | 4° | | 1° 30° Sixth Subject Code Digit. |
| 1° No. 53 | 4° | | 1° 30° Seventh Subject Code Digit. |
| | | | One 66° Sound Track Position Sector for 1,600 and 800 c. Pulses Indicating Positions in the Sound Track of the Beginnings and Endings of Items |
| 1° No. 54 | 4° | | 1° 66° Position Sector. Total 360°. |

The disc of FIG. 2 illustrates a simple example of the indexing of two separate items, the first item occupying the spiral sound track from radius 18 to radius 19 and being indexed in track 101, and the second item occupying the sound track from radius 20 to 21 and being indexed in track 102. In practice, separate bits of information lying within these items might be designated as separate index items and recorded in additional index tracks. With the exception of the DISCARD pulses such as 55, wherever there is a pulse in item tracks 101 or 102, there is a similar pulse in sum track O on approximately that same radius, having been recorded by the same coding head, which records in the item track for one revolution and then records in the sum track for one revolution. Thus the sum track O contains superposition of all the pulses in all the items (except that a pulse such as 55 in the discard sectors of an item track indicates DISCARD ITEM and is not placed in track O except to indicate DISCARD WHOLE DISC).

The eight digit index code for the first item is recorded in track 101 by the 36 positions along each of the eight 30° arcs of the following numbered 1600 c. pulses: 56 (which indicates the association level), and 57, 58, 59, 60, 61, 62 and 63 (which indicate the seven letters of the subject). These are followed by the 66° position sector in which 1600 c. pulse 64 is available to place the listening head at radius 18 in the sound track where the first item begins, and 800 c. pulse 65 is available to remove the listening head from the sound track when radius 19 is reached at the end of the item. However, the existence of nine discard pulses such as 55, and 36° apart, would quickly indicate that this item had been discarded after being recorded, and item 1 would not be heard. The second item, indexed in track 102, evidently has a different association level and is on a different subject (although the second subject digit 66 is fortuitously the same as the second digit 58 of the first item), and it has no discard pulses. In the position arc, 1600 c. pulse 67 is available to place the listening head at radius 20 where the second item begins, 1600 c. pulse 68 can operate an indicator when the corresponding radius has been reached by the listening head to show importance or emphasis. Additional emphasis pulse 69 has now been effectively erased by the superposition of an 1100 c. pulse, and 800 c. pulse 70 is available to remove the listening head when the ending radius 21 is reached, and its counterpart 71 in the sum track O, if scanned in reverse, can emplace the recording head to continue the recording on this disc.

The accurately positioned pulses which record the eight digit index code originate in the coding switch assembly surrounding supporting ring 72 in the lower third of FIG. 1. In this typical design, rotating contactor 73 (or electrostatic contactor of Firestone Pat. 1,953,753) is carried on the shaft 74 which supports the turntable of the storage recorder and index code recorder. Eight diagonally mounted stationary contact bars such as bar 75, lie in a plane at right angles to the centerline of the turntable shaft 74 and are carried on radially adjustable supports such as 76 which pass with moderate friction through eight square holes in the stationary supporting ring 72. By radial adjustment of support 76, rotating contactor 73 can either make no contact with bar 75 or make contact (or electrostatic contact) in any of 36 turntable orientations ⅚ degrees apart along a 30° arc. Support 76 is radially adjusted by vertically moving wedge 77 which is mounted on disc 78 carried on square vertical shaft 79, usually stationary. One-half of a standard typewriter keyboard of 26 letters and 10 numerals (the other half being cut off by the isometric three-quarter-section), is shown with its T at 80 and each of these keys is capable of pushing disc 78 upward a different and unique distance determined in part by the adjustment of stops such as 81. Thereby bar 75 is adjusted to trigger a pulse to send to the coding head 24 for recording (or to the coincidence circuit when searching) which shall by pulse position uniquely represent one of the 26 letters and 10 numerals of the first digit of the code (the association level digit). The pressing of space bar 82 once, through ratchet 83 and detent 84, rotates clockwise through 36° and holds the assembly consisting of square shaft 79, disc 78, and the setting wedge 77. Thereby, upon the depressing of the next letter key such as 80, the second digit (first digit of the subject) contact bar 85 will be set to orient another pulse to represent the second digit letter. Thus the eight digits of the code are spelled out in succession, this setting of the coding switch remaining till it is cleared by pushing all the supports 76 back to their inner positions where their bars make no contact, and by returning setting wedge 77 to its initial first digit position as shown. The coding switch controls a voltage train generator whose pulses are recorded by coding head 24.

When adding pulses to the last item track such as 102 (FIG. 2) and the sum track O, coding head 24 (FIG. 1) records in track 102 for one revolution, then in sum track O for one revolution, and returns to track 102 to be ready to add additional pulses if desired. One way of making these movements through the use of electromagnetically energized stop 86 which pulls the coding head into the sum track O, and electromagnetically energized stop 87 which pulls it into the index track presently in use such as 102, both of these electromagnets receiving current only when 4° contactor 51 (right center) is *made*, so that all scratches due to the lateral movement shall fall in the 4° arcs which are not used for recording pulses. However, stop 87 is laterally adjustable in increments by ratchet mechanism 88 which permits spring 89 to pull the stop inward by one track space each time coil 90 is energized to pull increment latch 91 downward and release it. The motion of stop 87 as coil 90 is successively energized, is like that of the carriage of a typewriter as its space bar is successively depressed. If a single backspace is added to ratchet 88, it will be useful. Stop 87 is returned to its track 101 starting position by stationary electromagnet 93' which is actuated while another disc is being emplaced. The searching and scanning circuits detailed later perform different functions depending on whether the coding head is scanning sum track O or one of the item tracks, so the presence of the coding head in sum track O is transmitted to the scanning circuits through wire 86' since stop 86 is then making contact with arm 27. Before changing discs, electromagnet 92 pulls the coding head high enough that its arm clears stop 86 and permits electromagnet 93 to pull the coding head clear of the disc.

If the recording principle utilized in the index code recorder is embossing, the needle pressure should average more nearly the lighter value ordinarily used on listening heads rather than the heavier value ordinarily used on recording heads, in order to minimize wear, since the needle traverses one track many times. Satisfactory recording of pulses is possible with light needle pressure, especially with vertical vibration, because the pulses are of short duration, active recording is being done during only a small fraction of each revolution and the coding head can supply a considerable impulse reaction from its inertia. As an additional refinement, the magnetic circuit of lifting coil 92 can have a magnetic circuit which retains some permanent magnetism as shown by N and S, and which lightens the needle pressure, but when a pulse is being recorded, coil 92 is supplied with rectified pulse current in such polarity as to oppose the retained magnetism and increase the needle pressure for the duration of each pulse recording only. Of course, magnetically recorded pulses have no such problem.

ALTERNATIVE LETTER KEYBOARD

For a portable machine, it is desirable to have a code letter keyboard having only a few keys instead of the 36 keys shown in FIG. 1. Very good code discrimination can be obtained with a reduced number of keys provided that the several letters which must be assigned to each key are so chosen that the individual keys have approximately equal probabilities of usage. Usage probabilities of the letters of the English Alphabet are proportional to: a 728; b 120; c 280; d 392; e 1000; f 236; g 168; h 540; i 704; j 55; k 88; l 360; m 272; n 670; o 672; p 168; q 50; r 528; s 680; t 770; u 296; v 152; w 190; x 26; y 184; z 22. For example, a fast and easy to learn 10 key keyboard of the shape used on 10 key adding machines is shown in FIG. 3. Numerals are shown at the top of each key, consonant letters at the middle level, and vowels at the bottom. The consonants carry more coding information per digit than the vowels and by omitting all vowels (except when the code is short), a long subject code phrase can be encoded which will carry very specific information. The proportional probability of key usage for the FIG. 3 keyboard is shown in Table 2.5 for the consonants only and again with the vowels included. Note that whereas with a 36 key keyboard there is a spread of more than a factor of 10 in the usage probabilities of the letter keys (whether or not the vowels are omitted), with the FIG. 3 keyboard and consonants only, the usage probability spread is less than a factor of 2 and even with the vowels included it is less than a factor of 3.5, all but one pair of keys having a lesser spread than a factor 2.1. Seven subject digits each capable of discriminating 10 letters have a maximum theoretical capability of discriminating $10^7$ subject items compared with $$36^7 = 7.6 \times 10^{10}$$

for the 36 key keyboard (assuming uniform key usage probabilities for both keyboards). But with only 10 keys to discriminate in each digit, it would be practical to have say 15 digits in the subject code, giving a maximum theoretical capability of discriminating $10^{15}$ subjects, so considering its smoother distribution of usage probability, the FIG. 3 keyboard of 10 keys would give superior coding performance.

to 8 inclusive; thus, PROPELLOr, CARTOGRAphy, and RADIO——.)

Level 7: Subject *class*(es) into which a subject falls. (Code is a 7 in first digit followed by a seven digit class name; thus, 7AVIATIOn.)

Level 6: Subject, headline, or title. (6HELICOPter.)

Level 5: Sub-subject, subtitle, chapter heading, paragraph heading, or key word of vocabulary. (5HOVERINg.)

Level 4: Abstract, summary, or conclusions. (4———.)

Level 3: User's addendum, footnote, critique, commentary, discussion, or verbalization of each subject code, usually on adjacent channel II of the storage recorder. (3———.)

Level 2: Beginning of index item, any level designation, or emphasized portion; end of trivia. (1600 c. pulse in 66° position arc.)

Level 1: Bulk of recorded discourse. (Probably not coded.)

Level 0: Trivia *begin*, in material previously recorded but now discarded herewith; end of index item. (800 c. pulse in 66° arc, or discard whole item in 1° arcs.)

The association levels most used are 5 and 6, with 7 a close third. If the subject being sought is recorded in either levels 5, 6, or 7, the user may wish to have it brought to his attention, and this can be done by not specifying any association level in the searching code by leaving the first digit blank when searching, thus —HELICOP. Any items containing HELICOPT as a level 8 associated subject would not be disclosed without an additional search with the searching code set to the latter code, since these two codes mismatch; this saves searching time by not bothering the user with items to which the sought subject has but a remote association. On the other hand, if the user wishes a quick search of the principal items of recorded material on this subject without going into too much detail, it may be best to search 6HELICOP or even 7AVIATIO. The searching of level 8 for HELICOPT is a last resort method of locating material distantly and broadly associated with this subject.

TABLE 2.5.—PROPORTIONAL PROBABILITIES OF KEY USAGE, EITHER WITHOUT OR WITH THE VOWELS, FOR THE KEYBOARD OF FIGURE 3

| 1 | 2 | 3 | 4 | 5 | 6 | 7 | 8 | 9 | 0 (zero) |
|---|---|---|---|---|---|---|---|---|---|
| BC 400 | D 392 | FG 404 | H J 595 | KLM 720 | N 670 | PQR 746 | S 680 | T 770 | VMX Z 390 } Space. |
| ABC 1128 | DE 1392 | FG 404 | HIJ 1299 | KLM 720 | NO 1342 | PQR 746 | S 680 | T 770 | UVWXY Z 870 } |

CODING OF ASSOCIATION LEVEL AND SUBJECT

The association level is preferably indicated by the first code digit and the subject indicated by digits 2 to 8 inclusive if there are seven or more letters in the subject word, so that it is not necessary to count the number of letters in the subject word as there is no harm in attempting to set more digits than the apparatus accommodates. Also, the distantly related associated subjects of level 8 below may be *excluded* from *all* searches at lower levels, by exceptionally spelling out the associated subjects in digits 1 to 8 instead of the usual 2 to 8 for subjects; a subject spelled one digit early results in a mismatch when searching, unless the searching code is also spelled one digit early. The various association levels are preferably classified as in Table 3, the method of coding them being exemplified in the parentheses, in which a hyphen indicates a vacant digit with no pulse.

TABLE 3.—CLASSIFICATION OF ASSOCIATION LEVELS

Level 8: Associated subject; important concepts or words *broadly associated* with the sound track's more specific subject below. (This level is not coded by an 8, but is an exception in that the name of each associated subject is spelled out by eight letters placed in digits 1

After a subject search has located an interesting item, a search of the neighboring items for 4 ———————— should quickly locate the abstract, summary, or conclusions of the item and their reproduction should begin, or a neighboring search for 3 ———————— should quickly locate any contemporaneous remarks which the use has made on storage channel II. If the user is busy, he can record position signals only for the main discourse being recorded on channel I, and whisper suggested subject codes into channel II for index coding later. To quickly discover what subjects are covered by a disc, scan the sum line 0 for 1600° C. begin signals, and either listen on channel I or listen on channel II to the verbalization of the subject codes; this islike scanning the table of contents of a book. Alternatively, set the searching code for 3 ———————— and listen on channel II to the verbalization of the subject codes.

THE OPERATING KEYS

Figure 4:
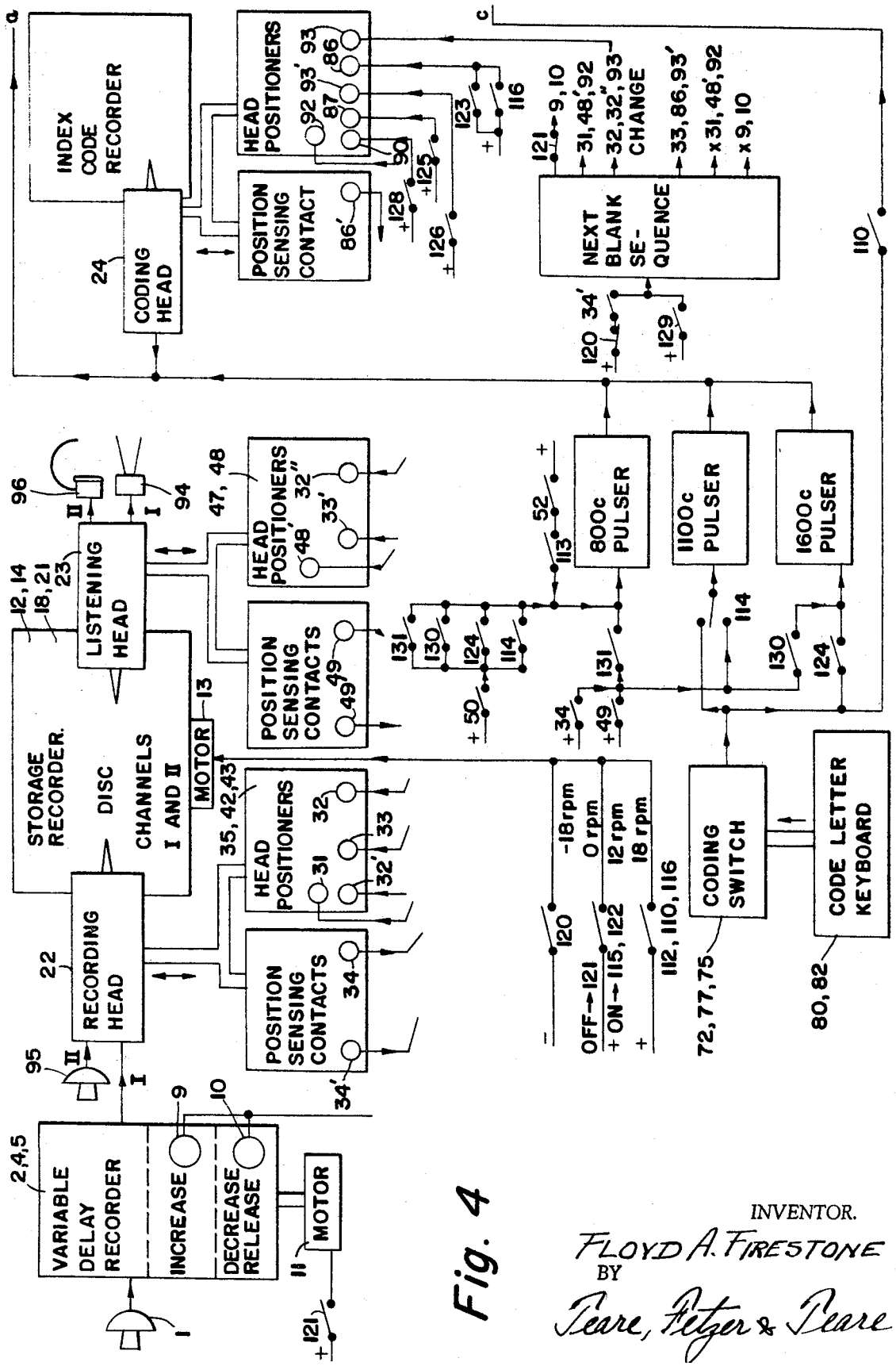
FIG. 4 is one-half of a block diagram of the apparatus and shows the connections between the portions of the apparatus used principally in recording and indexing on discs.

In addition to the previously mentioned subject letter coding keys such as 80, a group of twelve operating keys such as 120 (left) in an array of four rows and three columns, controls the operation of the apparatus when recording and adding index codes. The function of each key switch and its identifying numeral as found principally in the block diagram of FIG. 4, is given in Table 4 which is laid out in analogous array of four rows and three columns. A group of nine operating keys such as 110 (lower right of FIG. 1) in an array of three rows and three columns, controls the operation of the apparatus for search-scan-listen-edit, and their functions and identifying numerals are given in Table 5. These keys can be operated by touch.

TABLE 4.—THE RECORDING GROUP OF OPERATING KEYS

| 120 FIND BLANK (−18 r.p.m.). | 121 STAND BY, TRIVIA (0 r.p.m.). | 122 RECORD (12 r.p.m.). |
|---|---|---|
| 123 SUM TRACK 0 | 124 ADD CODE | 125 LAST ITEM. |
| 126 ITEM TRACK 101 | 127 PAST ITEM | 128 NEXT ITEM. |

| | Position where— | |
|---|---|---|
| 129 NEXT BLANK | 130 ITEM BEGINS, TRIVIA END, EMPHASIS (1,600 c.). | 131 ITEM ENDS, TRIVIA BEGIN (800 c.). |

TABLE 5.-THE SEARCH-SCAN-LISTEN-EDIT GROUP OF OPERATING KEYS

| 110 SEARCH THIS CODE (18 r.p.m.) | 111 STOP SEARCH | 112 (18 r.p.m.). |
|---|---|---|
| 113 DISCARD (item or disc) | 114 ERASE (1,100 c.) | 115 (12 r.p.m.). |
| 116 SCAN ALL CONTENTS (18 r.p.m.). | 117 RESUME SCAN; NEXT DISC (lower push). | 118 STOP SCAN. |

BLOCK DIAGRAM OF THE RECORDING AND INDEXING SYSTEM

Figure 5:
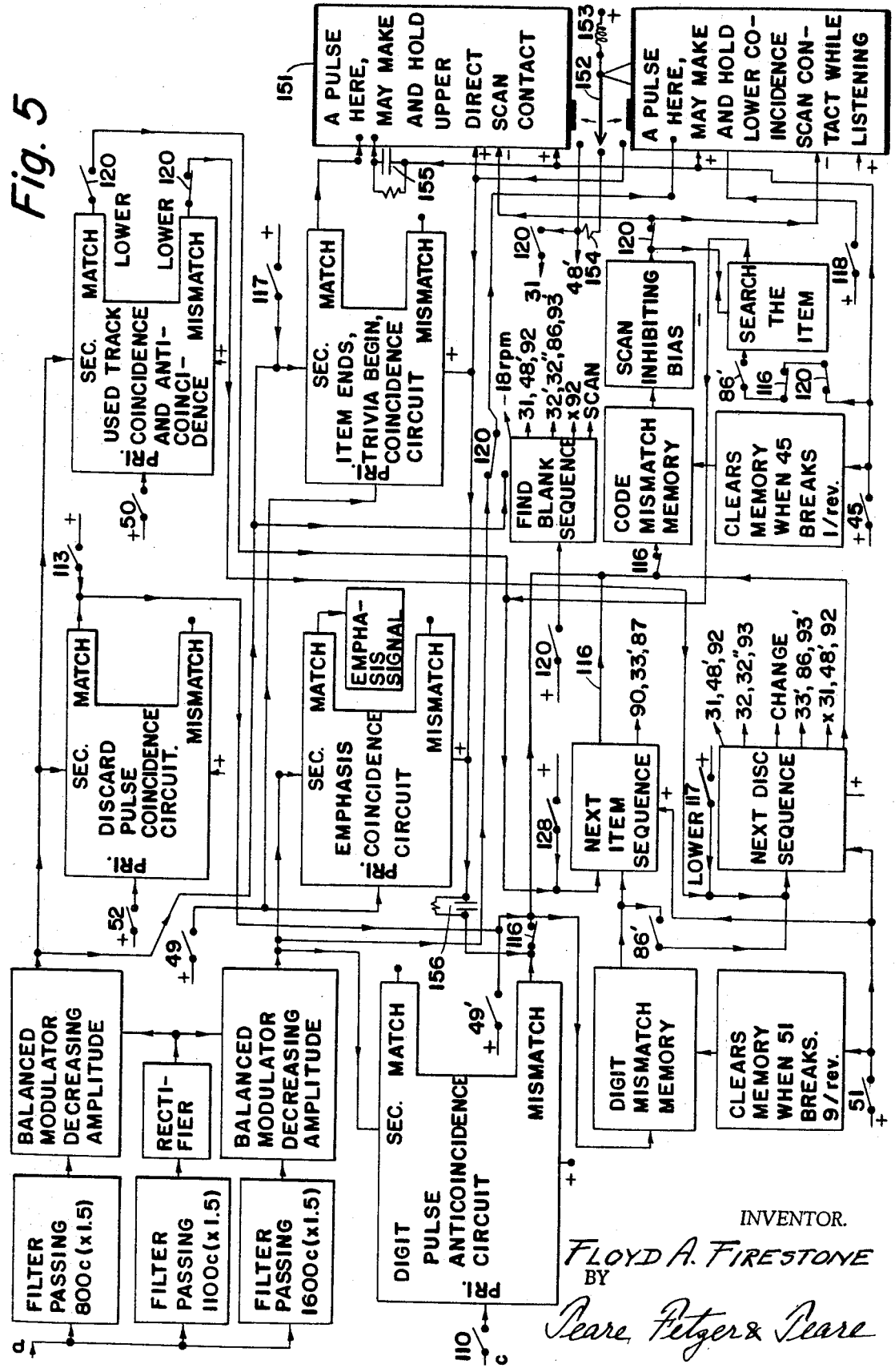
FIG. 5 is the second half of the block diagram and shows the connections between the portions of the apparatus used principally in searching, scanning, listening to and editing of discs.

FIG. 4 is a block diagram showing the functional relationships between the various parts of the mechanical and electrical system which are utilized principally during recording and indexing, the additional parts utilized during searching, scanning, listening and editing being shown in a continuing block diagram of FIG. 5. Numerals refer to elements previously described with reference to FIG. 1 except that the numerals associated with switches usually refer to blades on the often multiple blade switches associated with the operating keys whose numbers and functions are set forth in Tables 4 and 5. The electrical circuits named in the individual blocks can be constructed from their names as given, by anyone skilled in the art.

In FIG. 4, the main pickup microphone feeds through the variable delay recorder 2, 4, 5 to channel I of recording head 22 of the storage recorder 12, 14, 18, 21. Channel I is reproduced by listening head 23 feeding speaker 94. The user's microphone 95 records on channel II which reproduces in headphone 96.

The code letter keyboard 80, 82 (bottom) is mechanically connected to the coding switch 72, 77, 75 which upon the closing of switch 124 (ADD CODE) causes the 1600 c. pulser to feed coding pulses to the coding head 24 which are recorded in sum track O if key 123 (SUM TRACK O) has been pushed energizing coding head positioning magnet 86, and are recorded in the last item track if key 125 has been pushed energizing positioning magnet 87. The coding switch also feeds pulses through wire c (right) to the Digit Pulse Anti-Coincidence Circuit of FIG. 5 (left), when key switch 110 (SEARCH THIS CODE) is closed.

Each of the three heads is mechanically connected to its own position sensing contact(s), and to its own head positioner(s). Thus the head position sensing contacts are: on the recording head 22, contact 34 with 34' as inner radius limit (full record); on the listening head 23, contact 49 with 49' as inner radius limit; and on the coding head 24, contact 86' sensing the presence of the coding head in the outer radius sum track O. The corresponding head positioners are: on the recording head, electromagnets 32, 33, 32' and 31; on the listening head, electromagnets 32", 33' and 48'; and on the coding head, electromagnets 93, 86, 93', 87, 90 and 92.

The two paralleled position sensing contacts 34 and 49 for the recording and listening heads, when switch 130 (ITEM BEGINS, TRIVIA END, EMPHASIS) is closed, actuate the 1600 c. pulser to cause the coding head to record this other kind of position pulses; if switch 114 (ERASE) is closed downward, they actuate the 1100 c. pulser to erase by superposition a position pulse corresponding to the present head position, and if switch 114 is closed upward, the presently set code digit pulses are erased.

Nine 800 c. "used track" pulses per revolution are also recorded from contact 50 whenever any type of pulse is recorded in a track due to the depressing of any of the following four operating keys: 130 (ITEM BEGINS, TRIVIA END, EMPHASIS); 131 (ITEM ENDS, TRIVIA BEGIN); 124 (ADD CODE); or 114 (ERASE).

Upon the pushing of key 129 (NEXT BLANK) or the making of inner radius limit contact 34' (full record), the Next Blank Sequence (lower right) is actuated. First, unless key 121 (STAND BY, TRIVIA) is depressed, the sequence causes clutch 9 of the variable delay recorder to carry the delay pickup along with the recording medium thereby gradually increasing the delay from 12 to 20 seconds in 8 seconds (no sound being fed to the storage recorder), clutch 10 being released. Then magnets 31, 48' and 92 lift all three heads from the record when their needles pass a radial motion sector. Then magnets 32, 32" and 93 swing all heads outward off the disc. Then the disc is changed either manually or automatically. Then magnet 33 brings the recording head to starting radius 18, magnet 86 brings the coding head to sum track O, and magnet 93' resets the ratchet so that stop 87 is in a position corresponding to the first item coding track 101; the listening head may be left offside during recording. Then lifting magnets 31, 48' and 92 are released to drop the recording and coding needles into radial motion sectors in their respective tracks, the recording head clutching its drive screw 43. Thus far the Next Blank Sequence has been executed in a little less than 8 seconds. Finally, clutch 9 is released and clutch 10 is permitted to grab the slow motion and in about 80 seconds restore the delay from 20 to its normal 12 seconds, the slightly speeded speech output being fed meantime to the storage recorder if key 122 (RECORD) has remained closed. Thereby the record may be changed without missing the storage recording of a word of the speech. On the other hand, if key 121 (STAND BY, TRIVIA) has remained depressed, the delay will remain at 12 seconds throughout the blank changing period.

BLOCK DIAGRAM OF THE SEARCHING AND SCANNING SYSTEM

Let us now assume that a multiplicity of discs have been recorded and their items indexed and coded as to association level and subject, by means of the apparatus block diagrammed in FIG. 4. The addition of the apparatus block diagrammed in FIG. 5 enables these discs to be searched for any specified association level and subject code with the sought items reproduced, or the contents of all items to be scanned and their beginnings reproduced. The system of FIG. 5 should be considered as a continuation of FIG. 4 and lying to the right of FIG. 4. This FIG. 5 system for the control of searching and scanning is capable of initiating any of the actions summarized in Table 6 upon the pressing of operating keys 110 (SEARCH THIS CODE), 116 (SCAN ALL CONTENTS) 117 (RESUME SCAN), or 120 (FIND BLANK), the apparatus for carrying out these actions being detailed in what follows. If every pulse from the coding switch as set for the sought association level and subject, is matched by a coinciding pulse from the coding head running in sum track O or an item track, then a "match" exists between these two primary and secondary pulse sources; if not, there is a "mismatch."

centers of the pass bands of these filters would be at 800 c., 1100 c. and 1600 c. respectively, but since searching or scanning is usually done at 18 r.p.m., these filters must be returned to frequencies higher by the factor of 1.5. The rectified output of filter 1100 c. is fed into the modulating inputs of two balanced modulators which modulate downward the amplitudes of the outputs of filters 800 c. and 1600 c., thereby serving effectively to erase from the modulator outputs any 800 c. or 1600 c. pulse upon which the 1100 c. pulse might be superimposed in the coding track.

In FIG. 5 there are five blocks whose various actions are governed by the coincidence in time of pulses from various sources, and which are labelled respectively as follows: Digit Pulse Anticoincidence Circuit (left);

TABLE 6.—SUMMARY OF ACTIONS PRODUCED WHEN SEARCHING OR SCANNING

| Number | Operating Key | Kind of Coding Track | Part of Code Scanned | Match or Mismatch | Action Produced |
|---|---|---|---|---|---|
| 1 | 110 | Sum O | Single Digit | Match | None. |
| 2 | | | | Mismatch | Next Disc Sequence. |
| 3 | 110 | Item | Single Digit | Match | None. |
| 4 | | | | Mismatch | Next Item Sequence. |
| 5 | 110 | Sum O | Whole Code | Match | Next Item Sequence. Search the Items. |
| 6 | | | | Mismatch | Inhibits position scan. (Single Digit Mismatch has already actuated Next Disc Sequence.). |
| 7 | 110 | Item | Whole Code | Mismatch | Inhibits position scan. (Single Digit Mismatch has already completed one to eight Next Item Sequences.). |
| 8 | | | | Match | Permits position scan of item to go ahead, comprising periods of direct scan with listening head movement, and coincidence scan while listening. Finally, Next Item Sequence. |
| 9 | 110 | Blank track | Any Used Track Sector | Mismatch | Next Disc Sequence. |
| 10 | 116 and intermittently upper 117 | Item or Sum O | | | Next Item Sequence. Each (undiscarded) item scanned by periods of direct scan with listening head movement, and coincidence scan while listening. Finally, Next Disc Sequence. |
| 11 | 110 or 116 | Sum O | Any Discard Sector | Match | Next Disc Sequence. |
| 12 | do | Item | do | do | Next Item Sequence. |
| 13 | 120 | Sum O | The blank tail of the position arc | Direct scan to last end signal. | Recording head emplaced following previously recorded portion. |
| | | | 9 Used Track Sectors/rev | Match | Successive Next Item. Sequences till coding head is emplaced in next blank track. |

In the searching or scanning apparatus of FIG. 5, if the Next Disc Sequence (lower left) is actuated, magnets 31, 48' and 92 are energized to lift all three heads when their needles pass a radial motion sector as sensed by the periodic closing of contact 51 (lower left). Then magnets 32, 32" and 93 swing all heads outward off the disc. Then the disc is changed either manually or automatically. Then magnet 33' brings the *listening* head to the starting radius 18, magnet 86 brings the coding head to sum track O, and magnet 93' resets the ratchet so that stop 87 is in a position corresponding to the first item coding track 101; the recording head may be left offside during searching or scanning. Then lifting magnets 31, 48' and 92 are released to drop the *listening* and coding head needles into radial motion sectors in their respective tracks, unless the searching or scanning system described below (specifically the scanning system 151 at the right of FIG. 5) keeps the magnet 48' energized with the listening head lifted. Finally, a pulse is sent to trip the Code Mismatch Memory described below.

The coding head 24 of FIG. 4 now acts as pickup and reproduces the pulses which have been recorded in the coding tracks, starting with the sum track O, and transmits these pulses through connection "a" (upper right) to the set of three band pass filters at the upper left of FIG. 5 labelled 800 c. (×1.5), 1100 c. (×1.5) and 1600 c. (×1.5) respectively. If the searching or scanning were done at 12 r.p.m. at which the recording was done, the Emphasis Coincidence Circuit (center); Item Ends, Trivia Begin, Coincidence Circuit (right of center); Discard Pulse Coincidence Circuit (upper center); and Used Track Pulse Coincidence and Anticoincidence (upper right). Each of these has a primary pulse input into its left side labelled "Pri.," a secondary pulse input into its top labelled "Sec.," an output on the lower right labelled "Mismatch," an output on the upper right labelled "Match," and a power input at the bottom labelled "+." Except for the Used Track circuit, only a single output, either Mismatch or Match, is utilized. If a pulse enters the primary input and during its time interval another pulse enters the secondary input, this constitutes a coincidence and a pulse will be transmitted from the Match output. If no secondary pulse coincides with the primary pulse, a pulse will be transmitted from the Mismatch output soon after the receipt of the primary pulse. If a secondary pulse is received by itself, neither output will send out any signal. A multiplicity of detailed circuits having these properties are disclosed in the literature (for example, a 1956 McGraw-Hill book by Millman and Taub entitled "Pulse and Digital Circuits," specifically sections 13–3 and 13–5).

In FIG. 4 the Code Letter Keyboard 80, 82 is used to set the Coding Switch 72, 77, 75 to the association level and subject for which a search is to be made, and by the closing of operating key switch 110 (SEARCH THIS CODE), the coding pulses are transmitted through connection "c" (right) to the primary input of the Digit Pulse Anticoincidence Circuit of FIG. 5, which is also receiving as secondary input the 1600 c. (×1.5) pulses from the output of 1600 c. modulator. If every primary pulse from the coding switch is matched by a coinciding secondary 1600 c. (×1.5) pulse from the coding head running in a coding track, then there will be *no* output from the Digit Pulse Anticoincidence Circuit, but should any coding switch primary pulse *not* be thus matched, a pulse will be transmitted from the Mismatch output to the inputs of the Digit Mismatch Memory (lower left, Thyratron) and the Code Mismatch Memory (lower center, Thyratron). The Digit Mismatch Memory is cleared *nine* times per revolution by the *breaking* of radial motion contactor 51 (thereby giving that memory time to perform its controlling functions while contactor 51 is closed) and the Code Mismatch memory is cleared *once* per revolution by the *breaking* of 66° position arc contactor 45.

Actions 1 and 2 of Table 6: If the coding head is in sum track O, any mismatch of even a single digit of the code indicates that the sought association level and subject is not on this disc, and the resulting pulse from the Digit Mismatch Memory will pass through the coding head track O position sensing contact 86' and without even waiting to scan the remainder of track O will actuate the Next Disc Sequence which was explained at the beginning of this section. Thus actions 1 and 2 of Table 6 are discriminated and produced.

Actions 3 and 4 of Table 6: However, if the coding head were in an item track (having been ordered by action 5 below to Search the Items), then a mismatch in any digit would indicate that this item is not the one sought and the output pulse from the Digit Mismatch Memory will actuate the Next Item Sequence which moves the coding head to the next item track upon also receiving a pulse from radial motion contactor 51. The Next Item Sequence energizes magnet 90 to move the coding head ratchet inward one notch, energizes magnet 33' to pull the listening head back to starting radius 18, and energizes magnet 87 to pull the coding head inward to the next item track. Thus as many as eight unsought items could be scanned over and rejected, per revolution. The Next Item Sequence can also be actuated by the operating key 128, or by the Search the Items action 5 detailed below, so the Next Item Sequence also sends a pulse to trip the Code Mismatch Memory to avoid the possibility that this memory should indicate a full code match when only part of the code had been scanned; a full code match is determined only by scanning and matching all digits of the code for the full 294° from the breaking of 66° contactor 45 until it makes again.

Action 5: Whenever the Code Mismatch Memory is tripped until such time as that memory is cleared by the breaking of 66° contactor 45, it actuates a Scan Inhibiting Bias which inhibits the action of the position scanning system 151 explained below under action 8 and also inhibits action by the Search the Items unit (lower right). But if the coding head is in the sum O track and all digits of the code have been scanned in 294° with *no* mismatch, it indicates that the sought code item is probably on his disc and when 45 closes, a signal will pass through coding head position sensing contact 86', through Search the Items, to an input of the Next Item Sequence which will move the coding head to the rst item track 101 when radial motion contactor 51 is made 67° later. To avoid any scanning actions by system 151 during this 66° interval, the Search the Items unit sends an inhibiting voltage out of its own inhibiting terminal on top; thereafter, 86' is open while the items are being searched.

Action 6: If the coding head is in track O and a mismatch trips the Code Mismatch Memory, the sought code is not on this disc and the memory inhibits the position scanning system 151 and inhibits the Search the Items unit unil 45 breaks and clears the memory; meantime the Digit Mismatch Memory has already actuated the Next Disc Sequence under action 2 above.

Action 7: If the coding head is in an item track and a mismatch trips the Code Mismatch Memory, this item does not have the sought code and again the memory inhibits the position scanning system 151 until 45 breaks and clears the memory; meantime the Digit Mismatch Memory has already completed from one to eight Next Item Sequences.

Action 8: At last the sought item code has been found, the Code Mismatch Memory has not been tripped after a 294° scan of all digits, *no* Scan Inhibiting Bias is produced, and upon the making of 66° contactor 45, code searching of the item ceases and the position scanning and listening procedure is taken over by system 151 (right). System 151 is effectively an electronically controlled, latching, three position differential relay whose pivoted contact arm is normally held in the middle position as shown, by spring 153 which terminates in a source of voltage marked "+." The arm will also be returned to the middle position whenever there is Scan Inhibiting Bias. The upper, middle and lower positions of the contact arm produce upper, middle and lower positions of the listening head 23 by controlling the amount of current in lifting electromagnet 48'. The upper contact arm position sends full current to magnet 48' and lifts the listening head 23 till its pin 48 engages the listening head position cam 47. The middle contact arm position reduces the current in 48' by interposing resistor 154 thereby lowering the listening head to a free middle position; and the lower contact arm position cuts the current to 48' thereby dropping the listening head onto the disc for listening. The lower contact also supplies power to the positive terminals of the Emphasis Coincidence Circuit and to the Item Ends, Trivia Begin Coincidence Circuit. When 45 makes for the first time following a whole code match, it supplies power to the upper section of 151 and also introduces a pulse at the input terminal through leaky condenser 155 so the upper section is tripped, the contact arm 152 is pulled and held in the upper position, and the listening head being at radius 18 is raised to engage at once the positioning cam 47. This "direct scan" is short lived and lasts for only the few degrees of rotation required for the first Item Begins pulse to arrive at the coding head, for example, pulse 67 in track 102 of FIG. 2. The lower section of 151 has been rendered sensitive by the positive voltage from contact 45 and when the 1600 c. (×1.5) pulse 67 arrives at the lower section input, the contact arm 152 is pulled to and held in the lower position, the listening head is dropped onto the disc, listening bigins at the beginning of the item, an additional positive voltage is applied to the upper section to inhibit its response to additional pulses through condenser 155 only, and positive power is applied to the Emphasis and Item Ends Coincidence Circuits (center) whose primary pulses come from the listening head position sensing contact 49. For many revolutions this "coincidence scan" condition persists, the listening continuing, the listening head moving inward slowly along its sprial track til finally a primary pulse from the positio sensing contact 49 is matched by a coinciding 1600 c. (×1.5) secondary pulse 68 in the Emphasis Coincidence Circuit and the resulting pulse from its Match output actuates the Emphasis Signal. (This 1600 c. (×1.5) pulse produces no action in scanning system 151 whose contact arm 152 is already in the lower coincidence scan position.) The listening continues past coincidence with pulse 69 which produces no effect because it has the 1100 c. (×1.5) pulse superimposed upon it. Finally, the primary pulses from position sensing contact 49 are matched by a coinciding 800 c. (×1.5) secondary pulse in the Item Ends, Trivia Begin, Coincidence Circuit and the resulting pulse from its Match output actuates the upper section of 151 thereby pulling contact arm 152 back to the upper direct scan position and stopping the listening. For the remaining approximately 10° of position arc of track 102 there is direct scan with the listening head traveling quickly inward till the inner limit contact 49' (left) is made which introduces a pulse at the inputs of the Digit Mismatch Memory and the Code Mismatch Memory tripping them both. The latter immediately produces Scan Inhibiting Bias which return arm 12 to its middle position and terminates the scanning by 151 just before the code Mismatch Memory is cleared by the breaking of 66° contactor 45. The former produces a Next Item Sequence on the following contact by radial motion contactor 51 just before the breaking of 51 clears that memory. This moves the coding head to the adjacent *blank* track inward form track 102, resulting in action 9 below.

If in track 102 pulse 68 had been 800 c. (×1.5) and 69 had been 1600 c. (×1.5) (not erased), it would have indicated that the portion of this item from position 68 to position 69 had later been designated as trivial and system 151 would have scanned this item as follows: direct scan to 1600 c. pulse 67; coincidence scan with listening to 800 c. pulse 68; direct scan to 1600 c. pulse 69; coincidence scan with listening to 800 c. pulse 70; and finally direct scan to inner limit contact 49'.

Action 9: Throughout all the actions above, the Used Track Coincidence and Anticoincidence Circuit (upper right) has been receiving nine primary pulses per revolution from used track contactor 50 and these have been matched by the 800 c. (×1.5) pulses from the used track sectors of the coding tracks, but no action has been produced since switch 120 at the Match output is normally open (except for action 13 below). If the coding head runs into a blank coding track as in the example above, the resulting pulses from the Mismatch output will actuate the Next Disc Sequence. Thus following the scanning of item track 102 of FIG. 2, the resulting Next Item Sequence places the coding head on a blank track and this results in a Next Disc Sequence and the continuation of the search on the next disc.

Action 10: Actions 1 through 9 have been in response to operating key 110 (SEARCH THIS CODE) and only those items have been heard which match the sought code. Action 10 is in response to a question as to what is on these discs. The beginning of each (undiscarded) item and/or the accompanying Channel II user's commentary, is listened to in sequence by pressing operating key 116 (SCAN ALL CONTENTS) which opens a switch 116 in series with the Mismatch output of the Digit Pulse Anticoincidence Circuit thereby giving the same effect as if *each* item matched a sought code. If the coding head is in the sum track O of the FIG. 2 disc, Search the Items being cut off by the opening of a switch 116 in series with its input, then the scanning control system 151 will start the listening at the beginning of the first item in track O (marked 1600), contact arm 152 now going to the lower coincidence scan position. If the user recognizes the item and desires not to hear it all, he partially depresses key 117 (RESUME SCAN) (upper right) and the next time that the listening head position sensing contact 49 is made, a pulse will be sent from the Match output of the Item Ends Coincidence Circuit to trip the upper section of 151, pull arm 152 to the upper position, and produce a short direct scan till 1600 c. pulse 67' starts the listening again at the beginning of the second item. If key 117 is now partially depressed again, a short direct scan will start the listening again at the position corresponding to emphasis pulse 68'. Upon partially depressing key 117 again, a direct scan will carry the listening head to the inner radius limit and contact 49' (left), acting through the Digit Mismatch Memory, will actuate the Next Disc Sequence.

Alternatively, action 10 of key 116 (SCAN ALL CONTENTS) can be carried out by starting in the first item track 101, the scan of *all* (undiscarded) items going forward in the usual way except that it may be hastened by partially depressing key 117 (RESUME SCAN) as desired. Scanning the individual item tracks has the advantage that it automatically eliminates from the scan those items which have been discarded, in accordance with action 12 below. Thus item track 101 of the FIG. 2 disc would be discarded after a fraction of a revolution due to any one of the nine discard pulses such as 55, and the Next Item Sequence would transfer the scan to item track 102.

Key 118 (STOP SCAN) (lower right) holds arm 152 in the lower and listening position whenever it is desired to listen to the whole sound track without any interruptions from the scanning procedure.

Action 11: In either searching or scanning, if the coding head is in sum track O and there is an 800 c. (×1.5) pulse in any of the nine discard sectors, this indicates that the whole disc should be discarded. The Discard Pulse Coincidence Circuit (upper center) will find a Match between the primary pulses from discard contactor 52 and the 800 c. (×1.5) secondary pulses from the coding head. The resulting pulse from the Match output will trip the Digit Mismatch Memory which, since coding head position sensing contact 86' is closed, will actuate the Next Disc Sequence.

Action 12: Similarly, an 800 c. (×1.5) pulse in any of the nine discard sectors in an item track, indicates that the item should be discarded. The operation is as in action 11 except that 86' now being open, only the Next Item Sequence is actuated. When scanning (not searching), the Next Item Sequence is kept from tripping the Code Mismatch Memory by the open switch blade 116 at the input of that memory. As many as nine items can be discarded in one revolution by the successive operation of the Next Item Sequence.

Action 13: The problem is to resume recording and indexing on the remaining blank portion of a partially recorded disc after having been listening to it, or after it has just been emplaced again on the turntable. The partial pressing of operating key 120 (FIND BLANK) operates a multiple bladed switch which initiates certain actions after having changed the connections between certain parts of the system. One blade actuates the Find Blank Sequence (center of FIG. 5, not to be confused with the Next Blank Sequence of FIG. 4 which installs a completely blank disc) which first rotates the turntable in the reverse direction (−18 r.p.m.), then lifts all three heads to their free positions by 31, 48' and 92, then moves the recording head to the *inner* radius by 32' (the resulting closing of inner limit sensing contactor 34' produces no Next Blank Sequence action on FIG. 4 because of the opening of switch blade 120 in series with it), moves the listening head offside by 32", places the coding head in sum track O by 86 and the release of 92, and restores the ratchet to the first item track position by 93'. The output of scanning control system 151 is now connected to control the *recording* head by the closing of a 120 switch blade leading to lifting magnet 31. The Scan Inhibiting Bias output is disconnected by a 120 switch blade at its output and the Search the Items unit is disconnected by a 120 switch blade at its input. The input of the lower section of scanning control unit 151 is connected to receive the 800 c. (×1.5) pulses by means of a 120 switch blade (just above the Find Blank Sequence). When the 66° contact 45 is first made (in reverse), the resulting pulse through condenser 155 will trip the upper section of system 151 thereby raising arm 152 and the recording head to their upper positions, so that the recording head pin 35 immediately engages the inner radius end of its cam 42. The recording head is now carried outward till the coding head reaches the last end pulse 71 of FIG. 2, which causes the lower section of 151 to pull arm 152 to the lower position and place the recording head on the disc at the end of the recorded portion of the sound track. Key 120 is now depressed to its lower position, thereby changing the rotation to forward 18 r.p.m., and at the Used Track Coincidence and Anticoincidence Circuit opening the lower 120 switch blade at the Mismatch output and closing the lower 120 switch blade at the Match output. This results in the execution of nine Next Item Sequences per revolution until the coding head stops in the next *blank* track, at which time key 120 is released. The storage and index code recorders are now ready to record whenever keys 121 (STAND BY, TRIVIA), 122 (RECORD) and/or 124 (ADD CODE) are depressed.

Simplification: By sacrificing the abilities to erase and to indicate emphasis, it is possible to operate the index code recorder and the searching and scanning system, with pulses of one frequency only, say 1600 c. at 12 r.p.m. In Table 4 the EMPHASIS marking would be omitted from key 130 and in Table 5, key 114 ERASE omitted. In FIG. 4 the 800 c. and 1100 c. pulses would be omitted, the various inputs which are shown as leading to them (except 114 ERASE) would be lead to the 1600 c. pulser input instead. In FIG. 5 the three filters, rectifier, the two modulators, and the Emphasis Coincidence Circuit and Signal, would be omitted. The 1600 c. pulses entering FIG. 5 at "a" would feed to all remaining portions of the system which formerly received 1600 c. pulses, and also feed to all portions which formerly received 800 c. pulses. Position scanning system 151, if not inhibited, would pull arm 152 upward for direct scan upon the making of contact 45 as formerly, would also pull arm 152 down for coincidence scan and listening upon receiving the first 1600 c. position pulse as formerly, and would resume direct scan upon receiving a pulse from the Match output of the Item Ends, Trivia Begin Coincidence Circuit which has now been found a coincidence with the second 1600 c. pulse, etc. The odd numbered pulses in any position arc produce coincidence scan and listening, while the even numbered pulses produce direct scan. This simplification is included in the block diagrams of FIGS. 7 and 8, which also pertain to the tape recorder embodiment of my invention, though the simplification can be used with either the disc or tape embodiments.

TAPE RECORDER EMBODIMENT

Tape recorders are articles of commerce of a type which will accept a stack of tape reels (usually in magazines) automatically thread the tape, and after recording or reproducing a reel will rewind it and emplace and thread the next reel.

Figure 6:
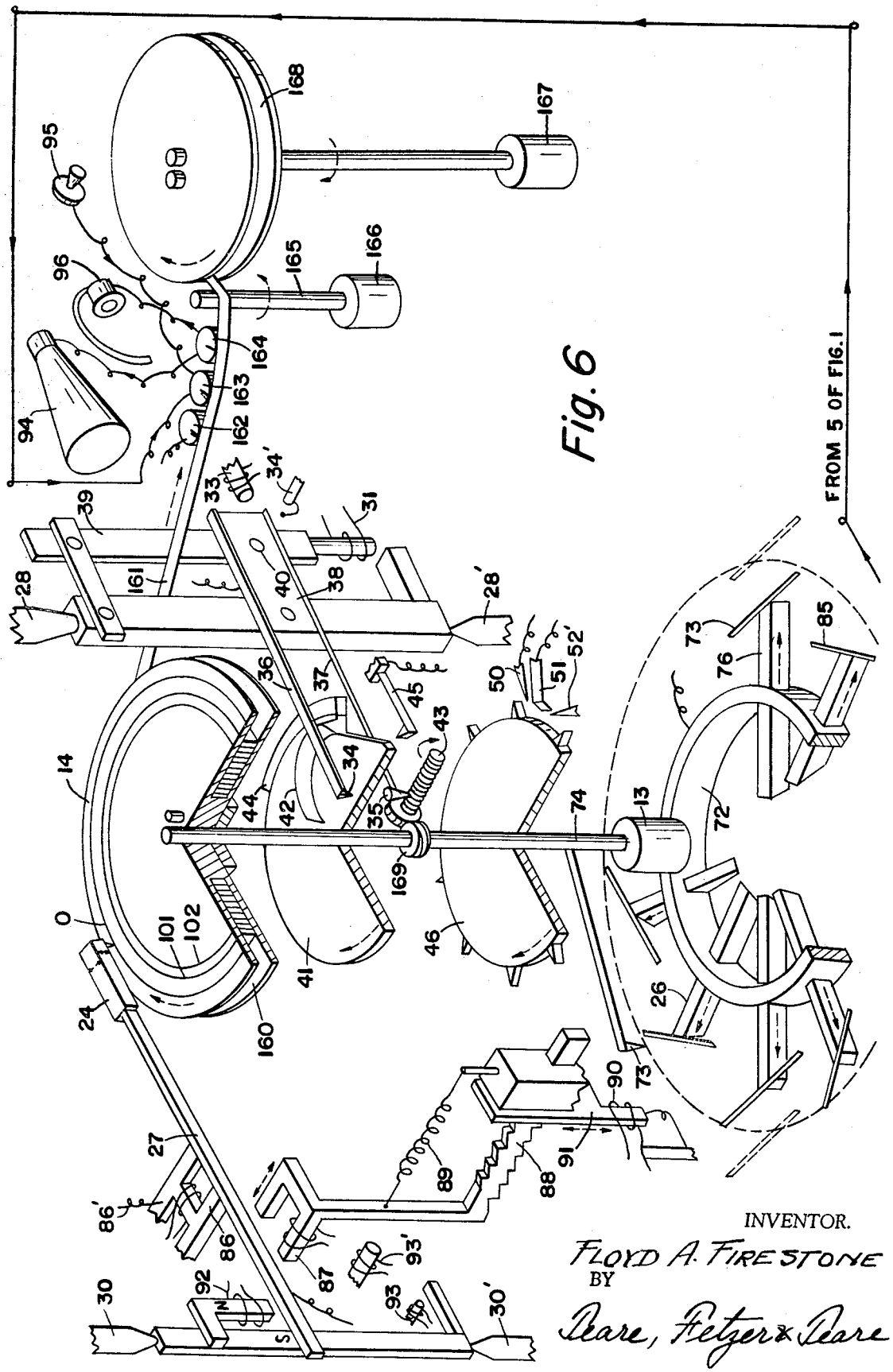
FIG. 6 is an isometric three-quarter section showing the mechanical portions and some electrical portions of a tape type of delayed sound recorder, index coder, searcher and scanner, in accordance with my invention.

When the storage recorder utilizes its recording medium in the form of tape, my invention preferably takes the form shown in FIG. 6 wherein one of the faces 14 of the storage tape reel 160 is utilized as a disc on which to record in circular tracks O, 101, 102, etc., the index coding signals for the items on that tape, either by embossing or magnetic recording with the face preferably being pregrooved. Coding head 24 with the same positioning and position sensing means which was previously explained with reference to FIG. 1, is now shown at the left of FIG. 6. As was previously explained with reference to FIG. 2, coding head 24 records subject coding pulses and position pulses in sum track O (except that in the position arc of sum track O only, the Item Begin and Trivia Begin pulses are now preferably omitted, the position arc containing only Item End and Trivia End pulses, in order to expedite the SCAN ALL CONTENTS action 10) and in individual item index tracks 101, 102 etc. Tape 161 is unwound from storage reel 160 past two channel erase head 162, two channel recording head 163, and two channel listening head 164, being driven at selectable constant speeds of say 2 and 3 inches/sec by motor 166 for recording and listening respectively. Motor 167 drives takeup reel 168 with gentle torque during recording or listening at 2 or 3 inches/sec, and with fast rotation during fast forward motion of say roughly 40 inches/sec. During recording or listening, motor 13 under the tape storage reel is passive, but it can supply a slow forward speed for the initial one turn searching of sum track O to determine if the sought subject may be on this reel, and for extruding the tape leader to thread the machine if it is; it can also supply a fast reverse for fast rewind.

During recording or listening the constant tape speed is determined by motor 166 and its attached capstan 165, the storage reel and the other elements carried on its shaft 74 being driven by the tape at a speed of rotation which gradually increases as the amount of tape on the storage reel diminishes. Nevertheless, all the pulse producing elements are connected by rigid shaft 74 and the relative phases of the pulses will not be influenced by changes of rotation speed, even if fast forward speed is used. Thus shaft 74 carries coding switch contactor 73 which makes contact with bars 75, 85, etc. of the coding switch assembly 72 etc. as previously explained. Disc 46 fixed to shaft 74 still carries its nine contactor teeth which collaborate with contactors 50, 51 and 52' as before, but its cam and contactor 47 of FIG. 1 have been omitted since there is no listening head 23 to position. Disc 41 fixed to shaft 74 still carries the 66° arc 44 which collaborates with contactor 45, and carries the curved diagonal 66° position sensing contactor 42 which collaborates with contactor 34 to sense the angular position of pivoted members 38 etc. which now serve as tape footage senser. When a tape storage reel is first emplaced, magnets 31 and 33 are energized momentarily to seat pin 35 at the starting position near the right end of lead screw 43 which is driven from shaft 74 through worms 169. Contactors 42 and 43 can therefore generate pulses whose angular position depends upon the footage unreeled from the storage reel, thereby sensing the position of both the recording head 163 and listening head 164 relative to the tape recording medium. Contactor 42 now has no cam indentation on its lower face since there is no recording head 22 to position by radial motion.

Channel I of recording head 163 receives audio voltage from output 5 of the delay recorder (of FIG. 1) while channel II is fed from the user's commentary microphone 95. Channel I of the listening head 164 feeds to speaker 94 only the sought information, while channel II feeds the accompanying user's commentary to the user's headphone 96.

FIG. 7 is a block diagram showing the connections between those portions of the apparatus used principally in recording and indexing on the tape embodiment. This is quite similar to the disc embodiment already described with reference to FIG. 4, but with a few difference in details. As the tape recording and listening heads (163 and 163) now continuously bear the same positions relative to each other, a single set of Tape Position Sensing Contacts, 42, 34', 34 now serves to generate pulses whose phases indicate the position of both heads along the sound track; also the Tape Positioning Motors 13, 166, 167 serve to position both heads by moving the tape at fast or slow speeds as needed. As mentioned above, the Tape Footage Senser is set to zero on emplacing each reel, by momentarily energizing magnets 31 and 33. The coding head positioners and position sensing contacts are the same for the disc and tape embodiments. Only one pulse (of say 1600 c.) is shown in FIG. 7 since we are here illustrating the simplification. The Next Blank Reel Sequence is somewhat simplified because there is no listening head arm to move, but the user may optionally prefer to rewind (−13) the recorded reel before changing to the next blank reel.

FIG. 8 is a continuation of the block diagram of FIG. 7 but shows principally the connections between those portions of the apparatus used in the searching, scanning, listening to and editing of tape reels. This is quite similar in structure and function to the disc embodiment already described with reference to FIG. 5, but with a few differences in details. The filters and the Emphasis Coincidence Circuit have been omitted since we are here illustrating the simplification (albeit the three frequencies of pulses could be used in the tape embodiment if desired).

The position scanning control system 151 now alternates between a fast forward tape speed (upper contact energizing motor 167 at say 40 inches/sec.) while coincidence scanning for an Item Begins or Trivia End (odd numbered position pulse), and a slow listening speed (lower contact energizing motor 166 at say 3 inches/sec.) while coincidence scanning for an Item Ends or Trivia Begin position pulse (even numbered position pulse). This alternating fast and slow coincidence scan continues until interrupted by the Next (recorded) Reel Sequence which first opens scanning switch 180 (×180), optionally rewinds the tape onto the storage reel (−13) before the change, extrudes the tape leader after the change (13), and finally closes the scanning switch (180) permitting the alternating fast and slow scan to continue on the new reel (plus other actions indicated on the drawing). Since the item indexing tracks 101, 102, etc. pertain to items which are recorded on the tape sound track in sequence, each item occupying at least a few turns of the tape storage reel, and since items can be code searched and rejected at up to eight items per revolution, the fast forward scanning motion of the tape can be started as soon as the tape is threaded, and the code searching actions described below will always be carried out *before* the arrival at the listening head of the sound track of the sought items. Consequently, no Scan Inhibiting Bias is used.

The position scanning control system 151 receives its controlling pulses from the Match output of the position Pulse Coincidence Circuit which in turn receives its primary pulses from the Tape Position Sensing Contact 34 (FIGS. 6 and 7) and receives its secondary pulses from the coding head which picks them up from the circular track in which it is running. Since contact 34 sends out pulses only when the coding head is somewhere in the 66° position arc, only the *position* pulses picked up by the coding head can produce a Match in the Position Pulse Coincidence Circuit, and this can occur *only* when the tape has been wound to that position which the tape was in when that particular position pulse was recorded. The tape position where a Match occurs will be independent of whether the tape is running fast or slow. Each time that a Match occurs, this Position Pulse coincidence Circuit determines whether within the remaining few degrees of rotation of this particular 66° position arc, any additional position pulse follows the one which produced the Match; if not, the circuit sends a pulse from its No Following Pulse output which trips the Digit Mismatch Memory thereby actuating the Next Item Sequence if the coding head was in an item track, or actuating the Next Reel Sequence if the coding head was in sum track O (unless 120 is depressed for action 13).

The position arc of a typical taped item consists of a leading portion, an Item Begins pulse—a Trivia Begin pulse—a Trivia End pulse—an Item Ends pulse, and a tail portion. Originally this had only the Item Begins and Item Ends pulses but a central portion has subsequently been marked trivial. Throughout the leading portion, the tape is wound at fast forward speed, arm 152 of system 151 being held by spring 153 in the upper position which energizes motor 167. That upper contact also supplies a voltage through delay circuit 174 and 175, to activate the lower section of system 151 (the upper section now being inactive) so that when the tape reaches a position where the Item Begins pulse from the circular index track produces a Match pulse, this will pull arm 152 to the lower position and energize slow speed motor 166 while the listening proceeds. This lower contact also supplies a voltage through delay circuit 176 and 177 to energize the upper section of system 151 (the lower section now being inactive) so when the tape slowly reaches a position where the Trivia Begin pulse produces a Match pulse, this will pull arm 152 to the upper position and again energize fast forward motor 167 and the lower section. Thus alternate position pulse matches produce fast and slow tape motions. Since a single position pulse has a finite width and might conceivably produce matches on several successive revolutions, this possibility of malfunction is avoided by the delay circuits previously mentioned, which transfer the activation to the other section of 151 only after an adequate delay to avoid multiple action from a single pulse. When the *last* Item Ends pulse is reached, the tape will be placed on fast forward speed, the No Following Pulse output will energize the Next Item Sequence, and if another item matching the sought association level and subject code is found, the foregoing process will be repeated. Finally a blank item track will be reached, the Used Track Anticoincidence circuit will have a Mismatch, and the Next Reel Sequence will be actuated.

The various actions produced by the tape embodiment when searching or scanning (analogous to the actions produced by the disc embodiment listed in Table 6) are detailed below:

Actions 1 and 2: Because of the comparatively slow access to the various parts of the sound track on tape, the sum track O is of great value in speeding a search. While a newly emplaced reel of recorded tape is making its *first* revolution while threading, the coding head being in the sum track O, any mismatch of even a single digit of the code indicates that the sought association level and subject is not on this reel, the resulting pulse from the Digit Mismatch Memory will pass through the coding track position sensing contact 86′, and without even waiting to scan the remainder of track O will actuate the Next Reel Sequence, quickly rewinding the tape leader and emplacing the next reel. Thus actions 1 and 2 are discriminated and produced and a dozen or more reels can be eliminated from the search in a minute.

Actions 3 and 4: However, if the coding head were in an item track (having been ordered by action 5 below to Search the Items) then a mismatch in any digit would indicate that this item is not the one sought and the output pulse from the Digit Mismatch Memory will actuate the Next Item Sequence which moves the coding head to the next item track upon also receiving a pulse from radial motion contactor 51. The Next Item Sequence energizes magnet 90 to move the coding head ratchet inward one notch, and energizes magnet 87 to pull the coding head inward to the next item track. Thus as many as eight unsought items could be searched over and rejected, per revolution. The Next Item Sequence also sends a pulse to trip the Code Mismatch Memory to avoid the possibility that this memory should indicate a full code match when only part of the code had been scanned; a full code match is determined only by scanning and matching all digits of the code for the full 294° from the breaking of 66° contactor 45 until it makes again. Thus actions 3 and 4 are quite similar for the tape and disc embodiments. These actions can proceed even while the storage reel is making its first few revolutions and even while the tape is being threaded.

Action 5: Whenever the Code Mismatch Memory is tripped until that memory is cleared by the breaking of 66° contactor 45, it actuates an Item Search Inhibiting Bias which inhibits the action of the Search the Items unit (lower right). But if the coding head is in the sum track O and all digits of the code have been scanned in 294° with *no* mismatch, it indicates that the sought code item is probably on this reel and when 45 closes, a signal will pass through coding head position sensing contact 86′, through Search the Items, to an input of the Next Item Sequence which will move the coding head to the first item track 101 when radial motion contactor 51 is made 67° later. Thereafter the Search the Items unit will be inactive because 86' will be open, and the search of the items will proceed normally until a blank item track is found.

Action 6: If the coding head is in sum track O and a mismatch trips the Code Mismatch Memory, the sought code is not on this reel and the memory inhibits the Search the Items unit until 45 breaks and clears the memory; meantime the Digit Mismatch Memory has already actuated the Next Reel Sequence under action 2 above.

Action 7: If the coding head is in an item track and a mismatch trips the Code Mismatch Memory, this item does not have the sought code, but this memory takes no action since the Digit Mismatch Memory has already initiated a Next Item Sequence which it can execute as often as eight times per revolution.

Action 8: At last the sought item code has been found, the Digit Mismatch Memory has not been tripped after a 294° scan of all digits, and will not be tripped by successive revolutions of the reel so long as the coding head remains in this item track. The position scanning control system 151 will continue its alternating periods of fast forward tape winding and slow speed listening to sought information, as was explained above with reference to FIG. 8, until the *last* Item End pulse is reached, whereupon the tape will be placed on fast forward speed, the *No* Following Pulse output will energize the Next Item Sequence and the search of the items will continue (till action 9).

Action 9: Throughout all the actions above, the Used Track Coincidence and Anticoincidence Circuit (upper right) has been receiving nine primary pulses per revolution from used track contactor 50 and these have been matched by the 1600 c. ($\times 1.5$) pulses from the used track sectors of the coding tracks, but no action has been produced since switch 120 at the Match output is normally open (except for action 13 below). When the coding head finally reaches a blank coding track, the resulting pulses from the Mismatch output will actuate the Next Reel Sequence and the search will be continued on the next reel, starting in sum track O as usual.

Action 10: Actions 1 through 9 have been in response to operating key 110 (SEARCH THIS CODE) and only those items have been heard which match the sought code. Action 10 is in response to a question as to what is on this reel. The beginning of each (undiscarded) item and/ or accompanying Channel II user's commentary, is listened to in sequence by pressing operating key 116 (SCAN ALL CONTENTS) which opens a switch 116 in series with the Mismatch output of the Digit Pulse Anticoincidence Circuit thereby giving the same effect as if *each* item matched a sought code. Suppose the coding head is in the sum track O and that in this track the only position pulses which have been recorded in this track are the first Item Begins pulse and the various Item Ends pulses, as I recommend. The Search the Items unit has been rendered passive by the opening of a switch blade 116 in series with its input so the Next Item Sequence will be passive and the coding head will remain in the sum track O. When the first Item Begins signal produces its Match, scanning system control system 151 is thereby placed in the slow speed listen condition. The user then listens to the beginning of the item and as soon as he recognizes it as one he does not wish to hear, he presses key 117 (CHANGE SCAN) and system 151 switches to fast forward speed. When the Item Ends position pulse is reached, system 151 switches to slow speed listening and the beginning of the next item, which follows immediately, will be heard. Thus the beginnings of each item or the user's commentary, can be heard in succession. At the last Item Ends pulse, the *No* Following Pulse output will trip the Digit Mismatch Memory and produce a Next Reel Sequence.

Alternatively, action 10 of key 116 (SCAN ALL CONTENTS) can be carried out by moving the coding head from track O to the first item track 101 by also pressing 128 (NEXT ITEM). At the Item Begins pulse slow listening speed will begin. When the user has heard enough of the beginning of this item he may press keys 128 (NEXT ITEM) and 117 (CHANGE SCAN) whereupon the tape will run at fast forward speed till the Match occurs with the Item Begins pulse of track 102, producing slow listening speed again. This process may continue till the beginnings of all the items have been heard and the blank item track produces a Mismatch in the Used Track Anticoincidence Circuit which actuates the Next Reel Sequence. Control of the scanning from the item tracks instead of from sum track O has the advantage that discarded items and trivia will be excluded from the reproduction.

Action 11: In either searching or scanning, if the coding head is in sum track O and there is a 1600 c. ($\times 1.5$) pulse in any of the nine discard sectors, this indicates that the whole reel should be discarded. The Discard Pulse Coincidence Circuit (upper center) will find a Match between the primary pulses from discard contactor 52 and the pulses from the coding head. The resulting pulse from the Match output will trip the Digit Mismatch Memory which, since coding head position sensing contact 86' is closed, will actuate the Next Reel Sequence.

Action 12: Similarly, a 1600 c. ($\times 1.5$) pulse in any of the nine discard sectors in an item track, indicates that the item should be discarded. The operation is as in action 11 except that 86' now being open, only the Next Item Sequence is actuated, and the search or scan continues on this reel.

Action 13: To resume recording and indexing on the remaining blank portion of a partially recorded reel after having been listening to it, or after it has just been emplaced, press key 120 (FIND BLANK) whose multiple bladed switch changes certain connections as shown in FIG. 8. The Find Blank Sequence places the tape on fast forward speed and puts the coding head in sum track O. The fast motion continues till the *last* Item Ends position pulse is passed at which time the *No* Following Pulse output actuates the lower section of scanning control system 151 to low speed which is now manually set for a recording speed of 2 inches/sec. Meantime the Match output of the Used Track Coincidence Circuit has been actuating the Next Item Sequence to move the coding head inward to smaller radius tracks at nine increments per revolution, till a blank coding track is found. The storage and index recorders are now ready to record whenever keys 121 (STAND BY, TRIVIA) 122 (RECORD) and/or 124 (ADD CODE) are depressed.

In order to aid the comprehension of the description of my invention, I have illustrated embodiments which have definite numerical specifications; however, my invention is not limited to the construction, proportions and arrangement shown and described, and changes and modifications may be made without departing from the scope of the invention as defined by the claims below. Nevertheless, wherever any of the following defined terms is used in a claim, whether or not it is enclosed in quotation marks, it shall have the specific meaning set forth in its definition hereinafter expressed.

A "pulse" is a number of cycles of oscillation of a physical magnitude, immediately preceded and immediately followed by substantially no oscillation; the number of cycles in a pulse may be any number from one half to a large number; the frequency of a pulse is the reciprocal of the period (time) of one of its cycles of oscillation.

A "lineal" sound track is a track along a sound recording medium, along which sound is recorded as a single valued function of time; examples, a spiral sound track on a constantly rotating disc, a single channel strip along a uniformly moving tape, or a helical track on a uniformly rotating belt.

A "repeating" track is a track along a recording medium which may be traversed successively by its own transducer many times during a single traverse by a sound transducer of the lineal sound track with which the repeating sound track is associated; examples of repeating tracks, a circular track on a disc, tape reel face or belt, or a spiral of a few turns with crossover from its end to its beginning.

A "terminus" is either a beginning or an end.

Two portions of recording medium are "attached" if the one is constrained to move when the other moves; examples, sound recording tape and the recording medium on its reel face, or two annuli of recording medium on a recording disc.

The "designation" of a section of sound track is the user's judgment of: its subject matter class, or its association level, or its importance level, or where the beginning or the end of an item is positioned along the sound track, or any combination of these.

An "index code word" is a group of characters, such as any of the characters on the keyboard of a typewriter which have been selected as expressive of the subject of an item recorded or being recorded on the storage recorder.

An "index code" is a group of characters, such as any of the characters on the keyboard of a typewriter which have been selected as expressive of the subject of an item recorded or being recorded on the storage recorder, and optionally also expressive of the association level of that item. Discussion of this concept and examples will be found above in the sections entitled—THE INDEX CODE RECORDER, and CODING OF ASSOCIATION LEVEL AND SUBJECT, and also in Table 3 entitled CLASSIFICATION OF ASSOCIATION LEVELS.

A "code of pulses" is a group of pulses so timed or positioned relative to a reference phase of a repeating motion, as to convey information specifying a definite index code, designation, and/or apparatus controlling action.

I claim:

1. A method of recording and indexing vocal sound comprising the steps of: recording said sound in a lineal sound track on a recording medium; and recording in a second track on a recording medium a pulse whose position along said second track designates by said position which letter occupies a digit, whose number is also designated by said position, of an "index code" whose digits carry information pertaining to the aforesaid sound.

2. A method of recording and indexing vocal sound comprising the steps of claim 1 with the limitation that said second track shall be a "repeating" track.

3. A method of recording and indexing vocal sound comprising the steps of: recording said sound in a lineal sound track on a recording medium; recording in a "repeating" track on a recording medium a pulse whose position relative to its medium designates by said position which letter occupies a designated digit of an "index code" whose digits carry information pertaining to the matter recorded in said lineal sound track; and recording in said "repeating" track a pulse whose presence and position relative to its medium indicate that said "repeating" track has been used.

4. A method of recording, indexing and editing vocal sound comprising the steps of: recording said sound in a lineal sound track on a recording medium; recording in a "repeating" track on a recording medium a pulse whose position relative to its medium designates by said position which letter occupies a designated digit of an "index code" whose digits carry information pertaining to an item of the matter recorded in said lineal sound track; and recording in said "repeating" track a pulse whose presence and position relative to its medium indicate that the item of sound recording corresponding to the aforesaid "index code" has been discarded.

5. A method of recording and indexing sound comprising the steps of: recording the sound in a lineal sound track on a portion of sound recording medium with a sound recording transducer; and recording in a "repeating" track on an attached portion of recording medium, a pulse whose position relative to the attached portion of recording medium is related to the present position of the sound recording transducer along the sound track.

6. A method of recording and indexing sound comprising the steps of: recording the sound in a lineal sound track on a recording medium with a sound recording transducer; and recording in a "repeating" track on a recording medium a pulse whose position relative to its recording medium is related to the position of the sound recording transducer along the sound track at the time when a terminus of a subject item was being recorded.

7. A method of recording and indexing sound comprising the steps of: recording the sound including spoken words in a lineal sound track on a recording medium; and recording in a "repeating" track on a recording medium a multiplicity of pulses, each of which designates by its sole position relative to its recording medium which letter occupies a designated digit of a word, to the end that the succession of letter designated by said multiplicity of pulses shall designate at least the beginning portion of the conventional dictionary spelling of one of said spoken words.

8. A method of recording and indexing sound comprising the steps of: recording in a lineal sound track on a portion of sound recording medium with a sound recording transducer a plurality of continuously recorded sound items separated by real time intervals of no recording; and recording in another track less than one-tenth the length of said lineal sound track on an attached portion of recording medium, a pulse whose position relative to the attached portion of recording medium is related by said position to the position of said sound recording transducer along the lineal sound track at the time when a terminus of one of the aforesaid items was being recorded, and a multiplicity of pulses whose individual positions relative to said attached portion of recording medium designate which letters occupy designated digits of a code word, which can be used to express a subject of said item.

9. A method of recording and indexing sound comprising the steps of: recording the sound in a lineal sound track on a recording medium with a sound recording transducer; and recording in a "repeating" track on a recording medium, a pulse whose position relative to its recording medium is determined by the position of said sound recording transducer along said lineal sound track at the time when said pulse was recorded, and another pulse whose position relative to the second mentioned recording medium lies within a region reserved for designating the association level of sound at the time said first mentioned pulse was recorded.

10. A method of recording and indexing sound comprising the steps of: recording in a lineal sound track on a recording medium with a sound recording transducer a plurality of continuously recorded sound items separated by real time intervals of no recording; and a recording in a "repeating" track on a recording medium, a pulse whose position relative to its recording medium is determined by the position of said sound recording transducer along said lineal sound track when it was recording a terminus of an item, another pulse whose position relative to the second mentioned recording medium lies within a region reserved for designating the association level of items, and a plurality of pulses whose positions relative to the second mentioned recording medium lies within a region reserved for designating the subject of items.

11. A method of recording and indexing sound comprising the steps of: recording in a lineal sound track on a recording medium with a sound recording transducer a plurality of continuously recorded sound items separated by real time intervals of no recording; recording on a recording medium in a plurality of "repeating" tracks each pertaining to a separate one of the items (1) a pulse whose position relative to the second mentioned recording medium is determined by the position of said sound recording transducer along said lineal sound track when it was recording a terminus of the item, and (2) another pulse whose position relative to the second mentioned recording medium lies within a region reserved for designating the subjects of items; and recording in an additional summational "repeating" track (a) a plurality of pulses whose positions relative to the second mentioned recording medium are determined by the several positions of said sound recording transducer along said lineal sound track when it was recording the several termini of said recorded items, and (b) a plurality of pulses whose positions relative to the second mentioned recording medium correspond one to one to the positions of all of the aforesaid pulses for designating the several subjects of the several items.

12. A method of recording and indexing sound comprising the steps of: recording in a lineal sound track on a recording medium with a sound recording transducer a plurality of separated sound items constituting a sound sequence; recording on a recording medium in a plurality of "repeating" tracks each pertaining to a separate one of the items, a pulse whose position relative to the second mentioned recording medium is determined by the position of said sound recording transducer along said lineal sound track when it was recording a terminus of the item; and recording in an additional summational "repeating" track on a recording medium a plurality of pulses whose positions relative to the last mentioned recording medium are determined by the several positions of said sound recording transducer along said lineal sound track when it was recording the several termini of the aforesaid items.

13. A method of recording and indexing vocal sound comprising the steps of: recording in a lineal sound track on a first portion of sound recording medium a plurality of vocal sound items; and recording on an attached portion of recording medium in a "repeating" track, a plurality of pulses each of which is dependent in its position relative to the attached portion of recording medium upon the subject of one of said items.

14. A method of recording and indexing sound comprising the steps of: passing an entrant sound through a delay recorder-reproducer having a predetermined delay time of 3 to 59 seconds, giving adequate time for the user to make a "designation" as to the entrant sound; selectively recording on a recording medium the output of said delay recorder-reproducer in a lineal sound track; and recording within said predetermined delay time in another track on a recording medium pulses whose positions relative to the last mentioned recording medium lie within a region reserved for recording "designations" of said entrant sound.

15. A method of recording and indexing sound comprising the steps of: passing an entrant sound through a delay recorder-reproducer having a delay time of 3 to 59 seconds, giving adequate time for the user to make a "designation" as to the subject of the entrant sound, its importance, and its terminus; recording portions of the output of said delay recorder-reproducer in a lineal sound track on a storage portion of sound recording medium with a sound storage recording transducer; and recording in a "repeating" track on an attached portion of recording medium, a pulse whose position relative to the attached portion of recording medium is determined by the position of said sound storage recording transducer along said lineal sound track when it was recording the aforesaid terminus and another pulse whose position relative to the attached portion of recording medium lies within a region reserved for recording subjects.

16. A method of recording and indexing long sound sequences without skipping any recording during the record changing interval, comprising the steps of: passing an entrant sound through a continuously operating delay recorder-reproducer having a variable delay time normally fixed within the range of 3 to 59 seconds, giving adequate time for the user to make a "designation" of said entrant sound; selectively recording the output of said delay recorder-reproducer in a lineal sound track on a storage portion of sound recording medium; recording in another track on an attached portion of recording medium, pulses whose positions relative to the attached portion of recording medium are related to a "designation" of said entrant sound; and just before beginning the changing of the storage and attached media, increasing the delay of said continuously operating delay recorder-reproducer by a total amount slightly exceeding the time interval required for changing the media.

17. A method of recording and indexing long sound sequences without skipping any recording during the record changing interval, comprising the steps of claim 16 with the added steps of: changing the storage and attached media, and grandually restoring the delay to its initial normal value.

18. A method of recording, indexing, and retrieving, sequential sound items, comprising the steps of: recording items of sound in a lineal sound track on a portion of sound recording medium; generating for an item of said sound track a code of pulses whose timings relative to a reference phase of a continuous angular motion are characteristic of the "designation" of the item; recording, on an attached portion of recording medium moving with said continuous angular motion, in a "repeating" track for each item, a code of pulses which is characteristic of the designation of that item; repeatedly generating the code of pulses characteristic of a sought item; reproducing in succession the item tracks until one is found whose code of pulses matches the sought code; and positioning a reproducing head in the sound track at a place corresponding to a position indicating pulse in said found item track.

19. A method of recording, indexing, retrieving and associating sequential sound items comprising the steps of claim 18 and the additional step of reproducing in succession the items thus found.

20. A method of recording, indexing and retrieving sequential sound items comprising the steps of: recording items of sound by means of a recording transducer in a lineal sound track on a portion of sound recording medium; generating for an item of said sound track, a code of subject pulses whose timings relative to a reference phase of a continuous angular motion are characteristic of the subject of the item, and a position pulse whose timing is uniquely dependent on the position of the sound recording transducer along the sound track at the beginning time of the item; recording, on an attached portion of recording medium moving with said continuous angular motion, in a "repeating" track for each item, the code of subject pulses and the position pulse, for that item; repeatedly generating the code of subject pulses characteristic of the subject of a sought item; reproducing in succession the item tracks until one is found whose code of subject pulses matches the sought code of subject pulses; and positioning a reproducing head in the sound track at a place corresponding to the beginning pulse in said found item track.

21. A method of recording, indexing, retrieving and associating sequential sound items comprising the steps of claim 20 and the additional step of reproducing in succession the sound items thus found.

22. A method of recording, indexing, retrieving and associating sequential sound items comprising the steps of: recording items of sound by means of a recording transducer in a lineal sound track on a portion of sound recording medium; generating for an item of said sound track, a code of subject pulses whose timings relative to a reference phase of a continuous angular motion are characteristic of the subject of the item and two position pulses whose timings are uniquely dependent on the positions of the sound recording transducer along the sound track at the times of the beginning and ending of the item respectively; recording, on an attached portion of recording medium moving with said continuous angular motion, in a "repeating" track for each item, the code of subject pulses and the position pulses, for that item; repeatedly generating the code of subject pulses characteristic of the subject of a sought item; reproducing in succession the item tracks until one is found whose code of subject pulses matches the sought code of subject pulses; positioning a sound reproducing transducer along the sound track at a place corresponding to the beginning position pulse in said found item track; continuing the sound reproduction until the reproducing transducer reaches a point along the sound track corresponding to the ending position pulse in said found item track; discontinuing the sound reproduction; resuming the successive reproduction of the item tracks and the matching of their subject codes against the sought subject code; and reproducing in succession the sound items thus found.

23. A method of recording, indexing, and rapidly finding sequential sound items, comprising the steps of: recording items of sound by means of a recording transducer in a lineal sound track on a portion of sound recording medium; generating for an item of said sound track, a code of subject pulses whose timings relative to a reference phase of a continuous angular motion are characteristic of the subject of the item, and a position pulse whose timing is uniquely dependent on the position of the sound recording transducer along the sound track at the time of beginning of the item; recording, on an attached portion of recording medium moving with said continuous angular motion, in a "repeating" track for each item, the code of subject pulses and the position pulse, for that item; repeatedly generating the code of subject pulses characteristic of the subject of a sought item; reproducing an item track until any pulse of the sought subject code is not matched in time, whereupon moving the item track reproducer to an adjacent item track; upon finding an item track whose reproduced subject code matches the sought code of subject pulses, positioning a sound reproducing transducer along the sound track at a place corresponding to the beginning position pulse in said found item track.

24. A method of recording, indexing and rapidly finding sequential sound items comprising the steps of claim 23 and the additional step of manually initiating the resumption of the searching process.

25. A method of recording, indexing, and rapidly finding sequential sound items comprising the steps of: recording items of sound by means of a recording transducer in a lineal sound track on a portion of sound recording medium; generating for an item of said sound track, a code of subject pulses whose timings relative to a reference phase of a continuous angular motion are characteristic of the subject of the item, and two position pulses whose timings are uniquely dependent on the positions of the sound recording transducer along the sound track at the times of the beginning and ending of the item respectively; recording, on an attached portion of recording medium moving with said continuous angular motion, in a "repeating" track for each item, the code of subject pulses and the position pulses, for that item; recording in an additional summational "repeating" track, the code of subject pulses and the position pulses, for every item on said portion of sound recording medium; repeatedly generating the code of subject pulses characteristic of the subject of a sought item; reproducing the summational track until any pulse of the sought subject code is not matched in time by a pulse reproduced from said track, whereupon changing to another record consisting of another similarly recorded portion of sound recording medium and its attached similarly recorded "repeating" tracks recording medium; similarly reproducing and testing the subject code match of the summational tracks of successive records until a record is found whose reproduced summational track supplies pulses matching in time each pulse of the sought subject code, whereupon moving the "repeating" track reproducer to an adjacent item track of that record; reproducing the last mentioned item track until any pulse of the sought subject code is not matched in time by a pulse reproduced from said item track, then moving the item reproducer to an adjacent item track; and, upon finding an item track whose reproduction supplies pulses matching in time each pulse of the sought subject code, positioning a sound reproducing transducer along the sound track at a place corresponding to the beginning position pulse in said found item track.

26. A method of recording, indexing, rapidly finding, and associating, sequential sound items, comprising the steps of claim 25 and the additional steps of: continuing the sound reproduction until the reproducing transducer reaches a point along the sound track corresponding to the ending position pulse in said found item track; discontinuing the sound reproduction; resuming the successive reproduction of the item tracks till others are found whose reproductions supply pulses matching in time each pulse of the sought subject code; and reproducing in succession the sound items corresponding to the item tracks thus found.

27. A method of recording and indexing sound items in long sound sequences without skipping any recording during the record changing interval, comprising the steps of: passing an entrant sound through a continuously operating delay recorder-reproducer having a variable delay time normally set to a fraction of a minute; recording the output of said delay recorder-reproducer in a lineal sound track on a storage portion of sound recording medium with a sound recording transducer; generating for an item of said sound track, a code of subject pulses whose timings relative to a reference phase of a continuous angular motion are characteristic of the subject of the item, and two position pulses whose timings are uniquely dependent on the positions of said sound recording transducer along the sound track when storage recording the beginning and the ending of the item respectively; recording, on an attached portion of recording medium moving with said continuous angular motion, in a "repeating" track for each item, the code of subject pulses and the position pulses, for that item; recording in an additional summational "repeating" track, the code of subject pulses and the position pulses, for every item on said portion of sound recording medium; just before beginning the changing of the storage and attached media, increasing the delay of said continuously operating delay recorder-reproducer by a total amount slightly exceeding the time interval required for changing the media; changing the media to blank; and recording in an item track and in the new summational track, a position pulse whose timing relative to an angular motion is uniquely dependent on the position of the sound recording transducer along the sound track when storage recording the ending of the item.

28. A method of recording and indexing sound items in long sound sequences, comprising the steps of claim 27 and the additional step of, after the new media are emplaced, gradually restoring the delay to its initial normal value.

29. A method of recording, indexing, and rapidly finding sound items in long sound sequences, comprising the steps of claim 27 and the additional steps of: repeatedly generating the code of subject pulses characteristic of the subject of a sought item; reproducing the summational track until any pulse of the sough subject code is not matched in time by a pulse reproduced from said track, then changing to another record consisting of another similarly recorded portion of sound recording medium and its attached similarly recorded "repeating"

tracks recording medium; similarly reproducing said testing the subject code match of the summational tracks of successive records until a record is found whose reproduced summational track supplies pulses matching in time each pulse of the sought subject code, then moving a "repeating" track reproducer to an adjacent item track of that record; reproducing that item track until any pulse of the sought subject code is not matched in time by a pulse reproduced from said item track, then moving the item reproducer to an adjacent item track; and, upon finding an item track whose reproduction supplies pulses matching in time each pulse of the sought subject code, positioning the sound reproducing transducer along the sound track at a place corresponding to the beginning position pulse in said found item track.

30. A method of recording, indexing, rapidly finding, and associating sound items in long sound sequences, comprising the steps of claim 28 and the additional steps of: repeatedly generating a code of subject pulses characteristic of the subject of a sought item; reproducing the summational track until any pulse of the sought subject is not matched in time by a pulse reproduced from said track, then changing to another record consisting of another similarly recorded portion of sound recording medium and its attached similarly recorded "repeating" tracks recording medium; similarly reproducing and testing the subject code match of the summational tracks of successive records until a record is found whose reproduced summational track supplies pulses matching in time each pulse of the sought subject code, then moving the "repeating" track reproducer to an adjacent item track of said last mentioned record; reproducing said last mentioned item track until any pulse of the sought subject code is not matched in time by a pulse reproduced from said item track, then moving the item reproducer to an adjacent item track; upon finding an item track whose reproduction supplies pulses matching in time each pulse of the sought subject code, positioning a sound reproducing transducer along the sound track at a place corresponding to the beginning position pulse in said found item track; continuing the sound reproduction until the reproducing transducer reaches a point along the sound track corresponding to the ending position in said found item track; discontinuing the sound reproduction; resuming the above described searching method till other items are found whose reproductions supply pulses matching in time each pulse of the sought subject code; and reproducing in succession the sound items corresponding to the item tracks thus found.

31. A method of resuming sound recording on a partially recorded record comprising the steps of: recording the sound in a lineal sound track on a portion of sound recording medium with a sound recording transducer; recording in a "repeating" track on an attached portion of recording medium, a pulse whose position relative to the attached portion of recording medium is dependent upon the position of the sound recording transducer along the sound track when it is recording the ending of a sound sequence; removing the sound recording transducer from the sound track; reproducing said "repeating" track and its pulse; and positioning the sound recording transducer along the sound track at a position corresponding to said pulse.

32. A method of resuming the recording and indexing of sound on a partially recorded record comprising the steps of: recording items of sound in a lineal sound track on a recording medium with a sound recording transducer; recording, on a recording medium, in a "repeating" track for each item, a code of pulses having positions relative to the last mentioned recording medium which depend upon the "designation" of that item; recording in an additional "repeating" track a pulse whose position relative to the last mentioned medium is dependent upon the position of the sound recording transducer along the sound track when it was recording the ending of the sound sequence; removing the sound recording transducer from the sound track and removing the item transducer from the item tracks; reproducing said additional "repeating" track and its pulse; positioning the sound recording transducer along the sound track to a position corresponding to the position of said last mentioned pulse; reproducing an item track and upon picking up a pulse, moving the item transducer to an adjacent item track; upon finding a blank item track, resuming the recording and indexing.

33. A method of recording and indexing sound comprising the steps of: recording items of sound in a lineal sound track on a portion of sound recording medium with a sound recording transducer; and recording in a "repeating" track on an attached portion of recording medium, a pulse of a first frequency whose position relative to the last mentioned recording medium is related to the position of the sound recording transducer along the sound track at the time when the aforesaid item was beginning, and a pulse of a second frequency whose position relative to the last mentioned recording medium is related to the position of the sound recording transducer along the sound track at the time when the aforesaid item was ending.

34. A method of recording and indexing sound comprising the steps of: recording items of sound in a lineal sound track on a portion of sound recording medium; recording in a "repeating" track on an attached portion of recording medium, a pulse of a first frequency whose position is related to the beginning time of an aforesaid item to be preserved, a pulse of a second frequency whose position is related to the beginning time of an aforesaid item to be discarded, a pulse of the first frequency whose position is related to the ending time of the aforesaid item to be discarded, and a pulse of the second frequency whose position is related to the ending time of the first aforesaid item to be preserved.

35. A method of recording, indexing and editing sound comprising the steps of: recording items of sound in a lineal sound track on a portion of sound recording medium; recording in a "repeating" track on an attached portion of recording medium, pulses of a first frequency whose positions relative to the last mentioned recording medium are expressive of the "designation(s)" of one of the items; effectively erasing a certain pulse by recording superimposed upon it a pulse of a second frequency; upon reproducing the "repeating" track, passing the pulses through filters which separate the pulses of first frequency from the pulses of second frequency; and passing the pulses of first frequency through a modulator whose output is amplitude modulated downward by the pulses of second frequency.

36. A method of recording and indexing vocal sound comprising the steps of: recording said sound in a lineal sound track; recording in a "repeating" track comprising as many arcs as letters in a chosen subject expression, a single pulse in each arc, there being fewer discriminated pulse positions in each arc than letters in the alphabet; setting the pulse positions in each arc by a keyboard having fewer keys than there are letters in the alphabet, the letters on the labels of said keys being so grouped that all of the keys shall have approximately equal average percentages of use.

37. Apparatus for recording and indexing sound comprising a sound recording carrier means which moves a repeating motion; said carrier means including a first sound recording medium; means for recording the sound in a lineal sound track on said medium; means for generating a code of pulses, the timings of which are related to said repeating motion; a second sound recording medium connected with said first medium; and means for recording on said second medium said code of pulses in a track which repeats in phase with said repeating motion.

38. Apparatus for recording and indexing sound comprising: a first sound recording medium; means for recording the sound in a lineal sound track on said medium; means for generating a code of pulses whose timings relative to a repeating motion are adjustable; a second sound recording medium connected with said first medium and moving with said repeating motion; and means for recording on said second medium said code of pulses in a "repeating" track on said second recording medium.

39. Apparatus for recording and indexing sound combining the elements of claim 38, said pulse timing adjusting means being controlled by a smaller number of keys than there are letters in the alphabet but all of the letters in the alphabet being so grouped on the labels of the keys that all of the keys shall have approximately equal percentages of use.

40. Apparatus for recording and indexing sound comprising: means for recording the sound in a spiral sound track on a rotating sound recording disc; adjustable means for generating a code of pulses whose timings are dependent upon the phase of rotation of said disc; and means for recording said code of pulses in a circular track on said disc.

41. Apparatus for recording and indexing sound comprising: means for recording the sound in a sound track on a tape which unwinds from a tape supply reel; means for generating a code of pulses whose timings relative to the rotation of said tape supply reel are adjustable; and means for recording said code of pulses in a "repeating" track on a disc of recording medium affixed to a face of said tape supply reel.

42. Apparatus for recording and indexing sound comprising: means for recording the sound in a lineal sound track, including a sound recording transducer which moves relative to said track; key controlled means for generating a pulse whose timing relative to a repeating motion depends upon the position of the sound recording transducer along the sound track when said key is pressed; and means for recording said pulse in a "repeating" track.

43. Apparatus for recording and indexing sound comprising: means for recording the sound in a lineal sound track with a sound recording transducer; key controlled means for generating a pulse whose timing relative to a repeating motion depends upon the position of the sound recording transducer along the sound track when said key is pressed; means for generating a code of pulses whose timings relative to said repeating motion are adjustable; and means for recording all of the aforesaid pulses in a "repeating" track constrained to said repeating motion.

44. Apparatus for recording and indexing sound comprising: a delay sound recorder-reproducer; means for recording the output of said recorder-repoducer in a lineal sound track with a sound recording transducer; key controlled means for generating a pulse whose timing relative to a repeating motion depends uniquely upon the position of the sound recording transducer along the sound track when said key is pressed; means for generating a code of pulses whose timings relative to said repeating motion are adjustable; and means for recording all of the aforesaid pulses in a "repeating" track constrained to said repeating motion.

45. Apparatus for recording long sound sequences comprising: a variable delay sound recorder-reproducer having a recording transducer continuously recording a sound track on a medium continuously moving relative to said transducer, and having a sound track pickup transducer in effective contact with said medium, said pickup transducer being capable of an additional motion relative to said medium for varying the amount of delay; means for recording the output of said sound pickup transducer on a storable portion of sound recording medium; means permitting the changing of the storable portion of sound recording medium; means for increasing the aforesaid delay by an amount exceeding the time required for changing the medium; and means for gradually restoring the delay to its initial value.

46. Apparatus for recording and indexing long sound sequences comprising: a variable delay sound recorder-reproducer having a recording transducer continuously recording a sound track on a medium continuously moving relative to said transducer, and having a sound track pickup transducer in effective contact with said medium, said pickup transducer being capable of an additional motion relative to said medium for varying the amount of delay; means for recording the output of said sound pickup transducer in a lineal sound track on a storable portion of sound recording medium by means of a second sound recording transducer; key controlled means for generating a pulse whose timing relative to a repeating motion depends uniquely upon the position of said second sound recording transducer along the sound track when said key is pressed; means for generating a code of pulses whose timings relative to said repeating motion are adjustable; means for recording all of the aforesaid pulses in a "repeating" track on an attached portion of recording medium, constrained to said repeating motion; means permitting the changing of both of the recording media aforesaid; means for increasing the aforesaid delay of said variable delay sound recorder-reproducer by an amount exceeding the time required for changing the media; and means for gradually restoring the delay to its initial value.

47. Apparatus for recording and indexing sound comprising: means for recording the sound in a lineal sound track; means for successively generating a plurality of codes of pulses whose timings relative to a repeating motion are adjustable and convey information relative to said sound; means for recording each code of pulses in its own separate "repeating" track constrained to said repeating motion; and means for recording every code of pulses in a single summational "repeating" track constrained to said repeating motion.

48. Apparatus for recording and indexing sound comprising: means for recording the sound in a lineal sound track with a sound recording transducer; key controlled means for generating a pulse of a first frequency whose timing relative to a repeating motion depends uniquely upon the position of the sound recording transducer along the sound track when said key is depressed; key controlled means for generating a pulse of a second frequency whose timing relative to the aforesaid repeating motion depends uniquely upon the position of the sound recording transducer along the sound track when this second key is depressed; and means for recording said pulses in a "repeating" track constrained to said repeating motion.

49. Apparatus for resuming the recording and indexing of sound comprising: means for recording the sound in a lineal sound track with a sound recording transducer; means for generating a pulse whose timing relative to a repeating motion depends uniquely upon the position of the sound recording transducer along the sound track when the recording was discontinued; means for recording said pulse in a "repeating" track constrained to said repeating motion; means for reproducing said "repeating" track; and means for positioning said sound recording transducer at a position along the sound track corresponding to the timing of the reproduced pulse relative to said repeating motion.

50. Apparatus for recording, indexing and retrieving sound comprising: means including a sound recording transducer for recording the sound in a lineal sound track; means including a sound reproducing transducer for reproducing said sound; key controlled means for generating a position pulse whose timing relative to a repeating motion depends uniquely upon the position of said sound recording transducer along the sound track when said key is pressed; means for generating a code of pulses whose timings relative to said repeating motion are adjustable; means for recording all of the aforesaid pulses in a "repeating" track constrained to said repeating motion; means for reproducing the pulses in said "repeating" track and simultaneously generating a code of pulses by said code of pulses generating means; means for determining whether the code of pulses reproduced from said "repeating" track matches a code of pulses now being generated by the aforesaid code of pulses generating means; means actuated by the aforesaid code match determining means for positioning said sound reproducing transducer to a position along said sound track corresponding to the aforesaid position pulse as reproduced from the track whose code matches.

51. Apparatus for recording, indexing and retrieving sound comprising: means including a sound recording transducer for recording the sound in a lineal sound track; means including a sound reproducing transducer for reproducing said sound; key controlled means for generating a plurality of position pulses whose timings relative to a repeating motion depend uniquely upon the positions of said sound recording transducer along the sound track at the times when said key was pressed; means for generating a plurality of codes of pulses whose timings relative to said repeating motion are adjustable; means for recording in each of a plurality of "repeating" tracks, one of the codes of pulses and one of the position pulses; means for successively reproducing the pulses in said "repeating" tracks and simultaneously generating a code of pulses by said code of pulses generating means; means for determining whether the code of pulses reproduced from a track matches a code of pulses now being generated by the aforesaid code of pulses generating means; means actuated by said code match determining means for positioning said sound reproducing transducer to a position along said sound track corresponding to that position pulse which is reproduced from the track whose code matches.

52. Apparatus for recording, indexing and retrieving sound comprising: means including a sound recording transducer for recording the sound in a lineal sound track; means including a sound reproducing transducer for reproducing said sound; key controlled means for generating a plurality of position pulses whose timings relative to a repeating motion depend uniquely upon the positions of said sound recording transducer along the sound track at the times when said key was pressed; means for generating a plurality of codes of pulses whose timings relative to said repeating motion are adjustable; means for recording in each of a plurality of "repeating" tracks, one of the codes of pulses and one of the position pulses; means including a track reproducing transducer for reproducing a "repeating" track and simultaneously generating a code of pulses by said code of pulses generating means; comparison means for determining when any pulse from a code now being generated by the aforesaid code of pulses generating means is matched or mismatched in time by a pulse from a code now being reproduced from the "repeating" track; means actuated by a pulse mismatch in said comparison means for moving said track reproducing transducer to an adjacent "repeating" track; means actuated by a code match in said comparison means for positioning said sound reproducing transducer to a position along said sound track corresponding to a position pulse reproduced from the track whose code matches.

53. Apparatus for recording, indexing, retrieving and associating sound comprising: means including a sound recording transducer for recording the sound in a lineal sound track; means including a sound reproducing transducer for reproducing said sound; key controlled means for generating a plurality of position pulses whose timings relative to a repeating motion depend uniquely upon the positions of said sound recording transducer along the sound track at the times when said key was pressed; means for generating a plurality of codes of pulses whose timings relative to said repeating motion are adjustable; means for recording in each of a plurality of "repeating" tracks constrained to said repeating motion, one of the codes of pulses and two of the position pulses; means including a track reproducing transducer for reproducing a "repeating" track and simultaneously generating a code of pulses by said code of pulses generating means; comparison means for determining when any pulse from a code now being generated by the aforesaid code of pulses generating means is matched or mismatched in time by a pulse from a code now being reproduced from the "repeating" track; means actuated by a pulse mismatch in said comparison means for moving said "repeating" track reproducing transducer to an adjacent, "repeating" track; means actuated by a code match in said comparison means for positioning said sound reproducing transducer to a position along said sound track corresponding to a first position pulse reproduced from the track whose code matches; means for reproducing the sound track until said sound reproducing transducer reaches a point along the sound track corresponding to the second position pulse reproduced from said track whose code matches; and means actuated by said second position pulse for moving said "repeating" track reproducing transducer to an adjacent "repeating" track.

54. Apparatus for recording, indexing, retrieving and associating sound according to claim 53, wherein the output of a continuously operating delay sound recorder-reproducer is connected to the input of the means including a sound recording transducer for recording the sound in a lineal sound track, and wherein means are provided for selectively starting and stopping said means including a sound recording transducer for recording the sound in a lineal sound track.

55. Apparatus for recording, indexing, retrieving and associating sound according to claim 53, wherein the output of a continuously operating variable delay sound recorder-reproducer is connected to the input of the means including a sound recording transducer for recording the sound in a lineal sound track, and wherein means are provided for selectively starting and stopping said means including a sound recording transducer for recording the sound in a lineal sound track.

56. Apparatus for recording, indexing and quickly finding sequential sound items comprising: means including a sound recording transducer for recording the sound in a lineal sound track on a first portion of sound recording medium; means including a sound reproducing transducer for reproducing said sound; key controlled means for generating a plurality of position pulses whose timings relative to a repeating motion depend uniquely upon the positions of said sound recording transducer along the sound track at the times when said key was pressed; means for generating a plurality of codes of pulses whose timings relative to said repeating motion are adjustable; means for recording on a second portion of recording medium, in each of a plurality of "repeating" tracks constrained to said repeating motion, one of the codes of pulses and a position pulse; means for recording on said second portion of recording medium in a single summational "repeating" track all of the aforesaid codes of pulses and all of the aforesaid position pulses; means including a "repeating" track reproducing transducer for reproducing a summational "repeating" track; comparison means for determining while reproducing the summational track when any pulse from a code now being generated by the aforesaid code of pulses generating means is not matched in time by a pulse now being reproduced from the summational track; means actuated by a summational track pulse mismatch in said comparison means for securing the changing of the first and second portions of recording media; means actuated by a summational track code match in said comparison means for moving the "repeating" track reproducing transducer to a single code "repeating" track; comparison means for determining when any pulse from the aforesaid code now being generated by the aforesaid code of pulses generating means is not matched in time by a pulse now being reproduced from this single code track; means actuated by a pulse mismatch in said last comparison means for moving the "repeating" track reproducing transducer to an adjacent single code "repeating" track; means actuated by a code match in said last comparison means from a single code track for positioning said sound reproducing transducer to a position along said sound track corresponding to the position pulse in this same single code track.

57. Apparatus for recording, indexing and quickly finding sequential sound items according to claim 56, wherein the output of a continuously operating delay sound recorder-reproducer is connected to the input of the means including a sound recording transducer for recording the sound in a lineal sound track on a first portion of sound recording medium, and wherein means are provided for selectively starting and stopping said means including a sound recording transducer for recording the sound in a lineal sound track on a first portion of sound recording medium.

58. Apparatus for recording, indexing and quickly finding sequential sound items according to claim 56 wherein the output of a continuously operating variable delay sound recorder-reproducer is connected to the input of the means including a sound recording transducer for recording the sound in a lineal sound track on a first portion of sound recording medium, and wherein means are provided for selectively starting and stopping said means including a sound recording transducer for recording the sound in a lineal sound track on a first portion of sound recording medium.

59. Apparatus for recording, indexing, quickly finding and associating sequential sound items comprising: means including a sound recording transducer for recording the sound in a lineal sound track on a first portion of sound recording medium; means including a sound reproducing transducer for reproducing said sound; key controlled means for generating a plurality of position pulses whose timings relative to a repeating motion depend uniquely upon the positions of said sound recording transducer along the sound track at the times when said key was pressed; means for generating a plurality of codes of pulses whose timings relative to said repeating motion are adjustable; means for recording on a second portion of recording medium, in each of a plurality of "repeating" tracks constrained to said repeating motion, one of the codes of pulses and two position pulses; means for recording on said second portion of recording medium in a single summational "repeating" track all of the aforesaid codes of pulses and all of the aforesaid position pulses; means including a "repeating" track reproducing transducer for reproducing a summational "repeating" track; means for determining while reproducing the summational track when any pulse from a code now being generated by the aforesaid code of pulses generating means is not matched in time by a pulse now being reproduced from the summational track; means actuated by a summational track pulse mismatch for securing the changing of the first and second portions of sound recording media; means actuated by a summational track code match for moving the "repeating" track reproducing transducer to a single code "repeating" track; means for determining when any pulse from the aforesaid code now being generated by the aforesaid code of pulses generating means is not matched in time by a pulse now being reproduced from this single code track; means actuated by a pulse mismatch for moving the "repeating" track reproducing transducer to an adjacent single code repeating track; means actuated by a code match from a single code track for positioning said sound reproducing transducer to a position along said sound track corresponding to the first position pulse in this same single code track; means for reproducing the sound track, until the reproducing transducer reaches a point along the sound track corresponding to the second position pulse reproduced from this same single code track; and means actuated by said second position pulse for moving said "repeating" track reproducer to an adjacent "repeating" track.

60. Apparatus for recording, indexing, quickly finding and associating sequential sound items according to claim 59, wherein the output of a continuously operating variable delay sound recording-reproducer is connected to the input of the means including a sound recording transducer for recording the sound in a lineal sound track on a first portion of sound recording medium, and wherein means are provided for selectively starting and stopping said means including a sound recording transducer for recording the sound in a lineal sound track on a first portion of sound recording medium.

61. Apparatus for recording, indexing, quickly finding and associating sequential sound items according to claim 59, wherein the output of a continuously operating variable delay sound recording-reproducer is connected to the inut of the means including a sound recording transducer for recording the sound in a lineal sound track on a first portion of sound recording medium, and wherein means are provided for selectively starting and stopping said means including a sound recording transducer for recording the sound in a lineal sound track on a first portion of sound recording medium.

62. Apparatus for recording, indexing and retrieving sequential sound items comprising: means including a sound recording transducer for recording the sound in a lineal sound track; means including a sound reproducing transducer for reproducing said sound; key controlled means for generating a pulse of a first frequency whose timing relative to a repeating motion depends uniquely upon the position of said sound recording transducer along the sound track when said key is pressed; key controlled means for generating a pulse of a second frequency whose timing relative to said repeating motion depends uniquely upon the position of said sound recording transducer along the sound track when this second key is pressed; means for recording said pulses in a "repeating" track constrained to said repeating motion; means for reproducing said "repeating" track; means for positioning said sound reproducing transducer at a position along said sound track corresponding to said pulse of the first frequency; reproducing the sound track until said sound reproducing transducer reaches a position along the sound track corresponding to said pulse of the second frequency.

References Cited

UNITED STATES PATENTS

| | | |
|---|---|---|
| 2,513,683 | 7/1950 | Shaper et al. |
| 2,561,698 | 7/1951 | Hogan _____ 179—100.2 |
| 2,939,712 | 6/1960 | Vegliante et al. _____ 274—9 |
| 3,001,180 | 9/1961 | Williams. |
| 3,028,454 | 4/1962 | Von Kohorn _____ 179—100.2 |
| 3,166,328 | 1/1965 | Roberts _____ 274—4 |
| 3,177,476 | 4/1965 | Robinson _____ 340—174.1 |
| 3,181,171 | 4/1965 | Erickson. |
| 3,212,074 | 10/1965 | Daniels et al. _____ 340—174.1 |
| 3,221,334 | 11/1965 | Jones. |
| 3,243,250 | 3/1966 | Keznicki _____ 352—29 |

FOREIGN PATENTS

| | | |
|---|---|---|
| 583,662 | 9/1959 | Canada. |
| 870,110 | 6/1961 | Great Britain. |

JOHN M. HORAN, Primary Examiner

J. F. PETERS, Jr., Assistant Examiner

U.S. Cl. X.R.

179—100.21; 274—46; 340—174.1